(12) United States Patent
Okudera

(10) Patent No.: US 7,543,025 B2
(45) Date of Patent: Jun. 2, 2009

(54) ADDRESS INQUIRY SYSTEM, COMPUTER SOFTWARE PRODUCT, AND ADDRESS INQUIRY METHOD

(75) Inventor: Yoichi Okudera, Tokyo (JP)

(73) Assignee: Norihiro Koizumi, Shizuoka-shi (JP)

( * ) Notice: Subject to any disclaimer, the term of this patent is extended or adjusted under 35 U.S.C. 154(b) by 512 days.

(21) Appl. No.: 09/875,208

(22) Filed: Jun. 6, 2001

(65) Prior Publication Data
US 2002/0052971 A1 May 2, 2002

(30) Foreign Application Priority Data
Oct. 30, 2000 (JP) ............................. 2000-329940

(51) Int. Cl.
*G06F 15/16* (2006.01)
(52) U.S. Cl. ............................. 709/206; 709/204; 707/1
(58) Field of Classification Search ................. 709/206, 709/204; 707/1–10; 455/412.1
See application file for complete search history.

(56) References Cited

U.S. PATENT DOCUMENTS

| | | | | |
|---|---|---|---|---|
| 5,717,863 A | * | 2/1998 | Adamson et al. | 709/204 |
| 5,742,769 A | * | 4/1998 | Lee et al. | 709/206 |
| 5,822,526 A | * | 10/1998 | Waskiewicz | 709/206 |
| 5,864,684 A | * | 1/1999 | Nielsen | 709/206 |
| 5,870,548 A | * | 2/1999 | Nielsen | 709/206 |
| 5,930,479 A | * | 7/1999 | Hall | 709/206 |
| 5,937,161 A | * | 8/1999 | Mulligan et al. | 709/206 |
| 5,944,787 A | * | 8/1999 | Zoken | 709/206 |
| 5,948,054 A | * | 9/1999 | Nielsen | 709/200 |
| 5,999,967 A | * | 12/1999 | Sundsted | 709/206 |
| 6,108,688 A | * | 8/2000 | Nielsen | 709/206 |
| 6,108,691 A | * | 8/2000 | Lee et al. | 709/206 |
| 6,112,227 A | * | 8/2000 | Heiner | 709/203 |
| 6,138,146 A | * | 10/2000 | Moon et al. | 709/206 |

(Continued)

FOREIGN PATENT DOCUMENTS

JP    10-091512    4/1998

(Continued)

OTHER PUBLICATIONS

Mazieres, David et al. "The Design, Implementation and Operation of an Email Pseudonym Server." Proceedings of the 5th ACM Conference on Computer and Communications Security. San Francisco, CA. ACM Press. pp. 27-36. 1998.*

*Primary Examiner*—Larry D Donaghue
*Assistant Examiner*—Jeffrey R Swearingen
(74) *Attorney, Agent, or Firm*—Oblon, Spivak, McClelland, Maier & Neustadt, P.C.

(57) ABSTRACT

This system includes a changer data base, in which a changer registers his or her own new address, relationally storing a new address disclosing condition for an inquirer who wishes to know the new address of the changer, a disclosure judge judging whether to disclose the new address to the inquirer based on the new address disclosing condition when the inquirer inquirers about the new address with the presentation of an old address of the changer, and a discloser disclosing the new address of the changer to the inquirer if the disclosure judge judges that the new address is disclosed. Hence, various responses, with a high degree of freedom, can be made depending on a changer's intention when an inquiry about the new address after change of the changer is sent from an inquirer.

36 Claims, 32 Drawing Sheets

U.S. PATENT DOCUMENTS

| | | | |
|---|---|---|---|
| 6,161,129 A * | 12/2000 | Rochkind | 709/206 |
| 6,373,940 B2 * | 4/2002 | Shaffer et al. | 379/355.02 |
| 6,405,243 B1 * | 6/2002 | Nielsen | 709/206 |
| 6,427,164 B1 * | 7/2002 | Reilly | 709/206 |
| 6,453,327 B1 * | 9/2002 | Nielsen | 715/500 |
| 6,654,779 B1 * | 11/2003 | Tsuei | 718/101 |
| 6,785,710 B2 * | 8/2004 | Kikinis | 709/206 |
| 6,920,483 B1 * | 7/2005 | Cordray et al. | 709/206 |

FOREIGN PATENT DOCUMENTS

| | | |
|---|---|---|
| JP | 10-290259 | 10/1998 |
| JP | 11-074931 | 3/1999 |
| JP | 11-163924 | 6/1999 |
| JP | 2000-200227 | 7/2000 |
| JP | 2000-285136 | 10/2000 |
| JP | 2001-005833 | 1/2001 |
| JP | 2001-067323 | 3/2001 |

* cited by examiner

FIG. 6

REGISTRATION OF CHANGER BASIC INFORMATION

◆ REGISTRATION OF CHANGER BASIC INFORMATION
(FOR INDIVIDUAL)

NAME OF CHANGER
FAMILY NAME [BROWN]   GIVEN NAME [TOM]   — 60

ADDRESS OF CHANGER
NUMBER [111]   STREET [SOUTH FIGUEROA STREET]   CITY [LOS ANGELES]   STATE [CALIFORNIA]   ZIP CODE [90017]   — 61

TELEPHONE NUMBER [212]-[XXXX]-[XXXX]   FAX NUMBER [212]-[XXXX]-[ZZZZ] ← 63

[ACQUISITION OF E-MAIL ACCOUNT]   IF THIS BUTTON CLICKED, AN E-MAIL ADDRESS IS GIVEN AUTOMATICALLY FROM INQUIRY CENTER AND DISPLAYED BELOW.   — 62

E-MAIL ADDRESS [after-change@new-isp.com]   HOME PAGE URL [   ]

DESIRED PASSWORD [tom01234]   — 20

FIG. 9

◆ REGISTRATION OF INQUIRER WHOSE INQUIRY CHANGER WANTS TO REFUSE IN INQUIRY REFUSAL LIST ◆

◆ REGISTRATION OF INQUIRER WHOSE INQUIRY CHANGER WANTS TO REFUSE IN INQUIRY REFUSAL LIST

| No. | E-MAIL ADDRESS FROM WHICH INQUIRY IS REFUSED | DATE OF REGISTRATION IN LIST | REASON OF REGISTRATION | | | |
|-----|-----------------------------------------------|------------------------------|------------------------|--|--|--|
| 01  | sophist@xxx.com                               | 2000.09.01                   | INITIAL REGISTRATION BY CHANGER | | | |
| 02  | sales@zzz.com                                 | 2000.09.01                   | INITIAL REGISTRATION BY CHANGER | | | |
| 03  | directmail@***.com                            | 2000.09.01                   | INITIAL REGISTRATION BY CHANGER | | | |
|     |                                               |                              |                        | | | |
|     |                                               |                              |                        | | | |

REGISTRATION
DELETION

◆ NOTICE OF COMPLETION OF CHANGER REGISTRATION ◆

◆ NOTICE OF COMPLETION OF CHANGER REGISTRATION ◆

● CHANGER REGISTRATION WITH FOLLOWING CONTENTS IS COMPLETED

```
       NAME: TOM BROWN
    ADDRESS: 111 SOUTH FIGUEROA STREET, LOS ANGELES, CALIFORNIA 90017
TELEPHONE NUMBER: 212-XXXX-XXXX
 FAX NUMBER: 212-XXXX-ZZZZ
E-MAIL ADDRESS: < after-change@new-isp.com >
SETTING CONTENTS: REGISTERED ADDRESS - OLD E-MAIL ADDRESS < before-change@old-isp.com >
                                     - NEW E-MAIL ADDRESS < after-change@new-isp.com >
                  RESPONSE IN OCCURRENCE OF INQUIRY - MAKE CHANGER JUDGE WHETHER TO DISCLOSE
                                                      ADDRESS TO INQUIRER AFTER ACQUISITION OF
                                                      INQUIRY INFORMATION
                  INFORMATION TO BE DISCLOSED - NEW E-MAIL ADDRESS < after-change@new-isp.com >
                  SETTING OF NOTICE OF INQUIRY - EXCLUDE MESSAGE TEXT FROM INQUIRY INFORMATION
                  SETTING OF ADVANCE INQUIRY REFUSAL LIST - < sophist@xxx.com >
                                                          - < sales@zzz.com >
                                                          - < directmail@***.com >

CHANGER ID:  ......
           PASSWORD:  tom01234
```

● PLEASE CONFIRM THAT THE ABOVE REGISTRATION CONTENTS AND CHANGER ID ARE SENT TO YOUR REGISTERED E-MAIL ADDRESS.

● IN CASE OF AMENDING REGISTRATION/SETTING CONTENTS, LOG IN CHANGER MENU ON HOME PAGE OF INQUIRY CENTER WITH CHANGER ID AND PASSWORD AND AMEND THEM.

◆ REGISTRATION OF INQUIRER BASIC INFORMATION ◆

◆ REGISTRATION OF INQUIRER BASIC INFORMATION ◆
(FOR INDIVIDUAL)

NAME OF INQUIRER

FAMILY NAME: FORD  →70
GIVEN NAME: BILL

ADDRESS OF INQUIRER

NUMBER: 222  →71
STREET: SUMMER STREET
CITY: BOSTON
STATE: MASSACHUSETTS
ZIP CODE: 02110

TELEPHONE NUMBER: 017 - XXXX - XXXX  →72

FAX NUMBER: 017 - XXXX - ZZZZ  →73

ACQUISITION OF E-MAIL ACCOUNT — IF THIS BUTTON CLICKED, AN E-MAIL ADDRESS IS GIVEN AUTOMATICALLY FROM INQUIRY CENTER AND DISPLAYED BELOW.

E-MAIL ADDRESS: ·····@aa.center.com

HOME PAGE URL:

DESIRED PASSWORD: bil156789  →39

◆ ISSUE OF E-MAIL ACCOUNT ◆   ◆ ISSUE OF E-MAIL ACCOUNT ◆

! WE ISSUE E-MAIL ACCOUNT AVAILABLE ONLY WHEN YOU USE INQUIRY CENTER.
(THIS E-MAIL ACCOUNT IS NOT USABLE EXCEPT FOR COMMUNICATION BETWEEN
YOU AND INQUIRY CENTER) SET YOUR E-MAIL SOFTWARE ACCORDING TO THIS.
CONTENTS ARE AS FOLLOWS.

! ITEMS DISPLAYED WITH "......" WILL BE ISSUED SIMULTANEOUSLY WITH THE
COMPLETION OF INQUIRER REGISTRATION AND WILL BE DESCRIBED IN E-MAIL WITH
NOTICE OF YOUR (INQUIRER'S) ID AND CONTENTS OF INQUIRER REGISTRATION.

ACCOUNT NAME: ......

E-MAIL ADDRESS: ......@aa.center.com

ACCOUNT ID: ......

PASSWORD: bil156789
(SAME AS PASSWORD DESIRED IN INQUIRER REGISTRATION)

POP SERVER: aa.center.com

SMTP SERVER: aa.center.com

FIG. 14

◆ NOTICE OF COMPLETION OF INQUIRER REGISTRATION ◆

● NOTICE OF COMPLETION OF INQUIRER REGISTRATION ◆

● INQUIRER REGISTRATION WITH FOLLOWING CONTENTS IS COMPLETED.

NAME: BILL FORD
    ADDRESS: 222 SUMMER STREET, BOSTON, MASSACHUSETTS 02210
    TELEPHONE NUMBER: 017-XXXX-XXXX
    FAX NUMBER: 017-XXXX-ZZZZ
    E-MAIL ADDRESS: <·····@aa.center.com> (E-MAIL ACCOUNT USABLE FOR INQURY CENTER ONLY)
    ACCOUNT NAME: ······
    ACCOUNT ID: ······
    POP SERVER: aa.center.com
    ·
    INQUIRER ID: ······
    PASSWORD: bill56789

● PLEASE CONFIRM THAT THE ABOVE REGISTRATION CONTENTS AND CHANGER ID ARE SENT TO YOUR REGISTERED E-MAIL ADDRESS.

● IN CASE OF AMENDING REGISTRATION/SETTING CONTENTS, LOG IN CHANGER MENU ON HOME PAGE OF INQUIRY CENTER WITH CHANGER ID AND PASSWORD AND AMEND THEM.

◆ NOTICE OF SEARCH RESULT OF INQUIRY ABOUT CHANGE INFORMATION ◆

◆ NOTICE OF SEARCH RESULT OF INQUIRY ABOUT CHANGE INFORMATION ◆

DEAR MR. BILL FORD, (INQUIRER ID: inq0001 )
● DATE AND TIME OF INQUIRY: 2000/09/01 20:30 (INQUIRY NO.XXX000)
● E-MAIL ADDRESS INQUIRED THIS TIME: < before-change@old-isp.com >

! SORRY THAT E-MAIL ADDRESS INQUIRED BY YOU IS NOT REGISTERED IN CHANGE INFORMATION IN INQUIRY CENTER.

INQUIRY ABOUT E-MAIL ADDRESS COMES TO AN END.

CHANGER MAY REGISTER CHANGE INFORMATION AT INQUIRY CENTER HEREAFTER IF THIS E-MAIL ADDRESS HAS RECENTLY BEEN CHANGED. WE RECOMMEND YOU TO MAKE INQUIRY AGAIN AFTER A WHILE.

[RETURN TO TOP PAGE]

FIG. 20

◆ NOTICE OF SEARCH RESULT OF INQUIRY ABOUT CHANGE INFORMATION ◆

● NOTICE OF SEARCH RESULT OF INQUIRY ABOUT CHANGE INFORMATION

DEAR MR. BILL FORD, (INQUIRER ID: inq0001　　　)
● DATE AND TIME OF INQUIRY: 2000/09/01　20:30　(INQUIRY NO.XXX000)
● E-MAIL ADDRESS INQUIRED THIS TIME: < before-change@old-isp.com >

! ONLY ONE E-MAIL ADDRESS MATCHES WITH E-MAIL ADDRESS INQUIRED BY YOU IS REGISTERED IN CHANGE INFORMATION IN INQUIRY CENTER.
● E-MAIL ADDRESS BEFORE CHANGE    ● MEMO OR PROFILE CHARACTERIZING
　 REGISTERED BY CHANGER                CHANGER

↗ < before-change@old-isp.com >          · I AM TOM IN LOS ANGELES. ↙
23                                                                    33

! WHEN YOU INQUIRE OF THIS CHANGER, CLICK "START INQUIRY" BUTTON.
　(AN E-MAIL REGARDING INQUIRY RESULT WILL BE SENT TO YOU)
! WHEN YOU DO NOT MAKE INQUIRY, CLICK "STOP INQUIRY" BUTTON.
　(CONTENTS OF INQUIRY E-MAIL ARE DELETED)

100 — [START INQUIRY]    [STOP INQUIRY]

```
┌─────────────────────────────────────────────────────────────────────────────┐
│ SENDER: ADDRESS INQUIRY CENTER          DESTINATION: TOM BROWN              │
│         < info@center.com >                          < after-change@new-isp.com > │
│ ┌─────────────────────────────────────┐                                     │
│ SUBJECT: WE SEND YOU MESSAGE FROM INQUIRER                                  │
├─────────────────────────────────────────────────────────────────────────────┤
│                                                                             │
│ ◆ SUBJECT: WE SEND YOU MESSAGE FROM INQUIRER  ◆                             │
│                                                                             │
│ DEAR MR. TOM BROWN, (CHANGER ID: chg001)                                    │
│ WE SEND YOU MESSAGE YOU INSTRUCTED US TO ACQUIRE IN YOUR INQUIRY.           │
│ WE SEND YOU MESSAGE FROM INQUIRER.                                          │
│                                                                             │
│ ● DATE AND TIME OF INQUIRY: 2000/09/01  20:30   (INQUIRY NO.XXX000)         │
│ ● E-MAIL ADDRESS OF INQUIRER: < inq0001@aa.center.com >                     │
│ ● MEMO OR PROFILE CHARACTERIZING INQUIRER: I AM BILL FORD, YOUR CLASSMATE FROM JUNIOR HIGH. │
│ ● SUBJECT: INVITATION TO CLASS REUNION PARTY.                               │
│ ● MESSAGE TEXT: DEAR MR. TOM BROWN,                                         │
│                 TWENTY YEARS HAVE PASSED ALREADY SINCE WE GRADUATED FROM JUNIOR HIGH. │
│                 I HOPE THAT···                                              │
│                                                                             │
│ ! MAKE RESPONSE TO THIS INQUIRER THROUGH E-MAIL OF "CONFIRMATION FORM" OR CHANGER MENU ON │
│   HOME PAGE OF INQUIRY CENTER.                                              │
│                                                                             │
│ ! IF YOU DO NOT RESPOND TO INQUIRER BY 20:30 IN 2000/09/XX,                 │
│   THIS INQUIRY BECOMES INVALID. PLEASE PAY ATTENTION TO THIS.               │
│                                                                             │
│ ( ACCESS TO CHANGER MENU ON HOME PAGE OF INQUIRY CENTER )                   │
│                                                                             │
└─────────────────────────────────────────────────────────────────────────────┘

FIG. 24
```

◆ NOTICE OF RESULT OF INQUIRY ABOUT E-MAIL ADDRESS ◆

◆ NOTICE OF RESULT OF INQUIRY ABOUT E-MAIL ADDRESS ◆

DEAR MR. BILL FORD (INQUIRER ID: inq0001　)
● DATE AND TIME OF INQUIRY: 2000/09/01　20:30 (INQUIRY NO.XXX000)
● E-MAIL ADDRESS INQUIRED THIS TIME: < before-change@old-isp.com >

! SORRY THAT CHANGER WHOSE NEW ADDRESS IS INQUIRED BY YOU REFUSES
　RECEIPT OF INQUIRY ABOUT NEW ADDRESS.

UNLESS THIS CHANGER CHANGES SETTING IN RECEIVING INQUIRY ABOUT NEW ADDRESS,
YOU CAN NOT INQUIRE OF THIS CHANGER ABOUT NEW ADDRESS.

INQUIRY ABOUT E-MAIL ADDRESS COMES TO AN END.
WE HOPE YOU WILL NOT TAKE IT AMISS.

[RETURN TO TOP PAGE]

NOTICE OF RESULT OF INQUIRY ABOUT E-MAIL ADDRESS ◆

◆ NOTICE OF RESULT OF INQUIRY ABOUT E-MAIL ADDRESS ◆

DEAR MR. BILL FORD, (INQUIRER ID: inq0001    )
● DATE AND TIME OF INQUIRY: 2000/09/01  20:30 (INQUIRY NO.XXX000)
● E-MAIL ADDRESS INQUIRED THIS TIME:  < before-change@old-isp.com >

! CHANGER WHOSE NEW ADDRESS IS INQUIRED BY YOU HAS DISCLOSED NEW E-MAIL ADDRESS.
NEW E-MAIL ADDRESS IS AS FOLLOWS.

< after-change@new-isp.com >  ↙ 24

INQUIRY ABOUT E-MAIL ADDRESS COMES TO AN END.

[RETURN TO TOP PAGE]

◆ NOTICE OF RESULT OF INQUIRY ABOUT E-MAIL ADDRESS ◆

◆ NOTICE OF RESULT OF INQUIRY ABOUT E-MAIL ADDRESS ◆

DEAR MR. BILL FORD (INQUIRER ID: inq0001    )
● DATE AND TIME OF INQUIRY: 2000/09/01  20:30 (INQUIRY NO.XXX000)
● E-MAIL ADDRESS INQUIRED THIS TIME: < before-change@old-isp.com >

! FOLLOWING CHANGERS HAVE E-MAIL ADDRESS INQUIRED BY YOU.
■ CHANGER A < before-change@old-isp.com >  · I AM JIM WHO HAS MOVED TO SAN FRANCISCO.
THIS CHANGER HAS DISCLOSED NEW E-MAIL ADDRESS. NEW E-MAIL ADDRESS IS AS FOLLOWS.
< jim@abc.com >  ←24

■ CHANGER B < before-change@old-isp.com >  · I AM TOM IN LOS ANGELES.
THIS CHANGER JUDGES WHETHER TO DISCLOSE NEW E-MAIL ADDRESS FOR YOU AFTER CONFIRMING CONTENTS OF INQUIRY MAIL FROM YOU. HENCE, PLEASE WAIT FINAL RESPONSE TO YOUR E-MAIL ADDRESS INQUIRY UNTIL CHANGER GIVES RESPONSE. WE SEND RESULT BY E-MAIL ON RECEIPT OF CHANGER'S RESPONSE. WAIT FOR A WHILE.

PLEASE UNDERSTAND THAT THIS INQUIRY BECOMES INVALID IF CHANGER DOES NOT RESPOND TO YOU BY 20:30 IN 2000/09/XX.

[RETURN TO TOP PAGE]

FIG. 27

SENDER: ADDRESS INQUIRY CENTER
< info@center.com >

DESTINATION: BILL FORD
< inq0001@aa.center.com >

SUBJECT: NOTICE OF CHANGER'S RESPONSE TO YOUR INQUIRY

◆ NOTICE OF CHANGER'S RESPONSE TO YOUR INQUIRY ◆
DEAR MR. BILL FORD ( INQUIRER ID: inq0001 )

- DATE AND TIME OF INQUIRY: 2000/09/01 20:30 (INQUIRY NO.XXX000)
- E-MAIL ADDRESS OF INQUIRER THIS TIME: < before-change@old-isp.com >

! TO YOUR INQUIRY ABOUT E-MAIL ADDRESS, CHANGER DID NOT DISCLOSE NEW E-MAIL ADDRESS THIS TIME. BUT YOU CAN MAKE INQUIRY ABOUT THIS CHANGER AGAIN BECAUSE CHANGER INSTRUCTS INQUIRY CENTER TO RECEIVE INQUIRY ABOUT E-MAIL ADDRESS FROM YOU HEREAFTER.

! THERE IS A POSSIBILITY THAT CHANGER COULD NOT SPECIFY YOU WITH CONTENTS OF "SUBJECT" AND "MEMO OR PROFILE CHARACTERIZING INQUIRER" OF THIS INQUIRY E-MAIL. WE RECOMMEND YOU TO MAKE INQUIRY NEXT TIME WITH EASIER CONTENTS.

FIG. 28

SENDER: ADDRESS INQUIRY CENTER
< info@center.com >

DESTINATION: BILL FORD
< inq0001@aa.center.com >

SUBJECT: NOTICE OF CHANGER'S RESPONSE TO YOUR INQUIRY

◆ NOTICE OF CHANGER'S RESPONSE TO YOUR INQUIRY ◆
DEAR MR. BILL FORD ( INQUIRER ID: inq0001    )

● DATE AND TIME OF INQUIRY: 2000/09/01  20:30   (INQUIRY NO.XXX000)
● E-MAIL ADDRESS INQUIRED THIS TIME: < before-change@old-isp.com >
● DEADLINE FOR RESPONSE: 2000/09/XX  20:30

! SORRY THAT CHANGER DID NOT RESPOND TO YOUR INQUIRY ABOUT E-MAIL ADDRESS BEFORE DEADLINE.

! PRESENT INQUIRY ABOUT E-MAIL ADDRESS COMES TO AN END, BUT WE RECOMMEND YOU TO INQUIRE OF THIS CHANGER ABOUT THE ADDRESS AGAIN AFTER A WHILE.

SENDER: ADDRESS INQUIRY CENTER
< info@center.com >

DESTINATION: BILL FORD
< inq0001@aa.center.com >

SUBJECT: NOTICE OF CHANGER'S RESPONSE TO YOUR INQUIRY

◆ NOTICE OF CHANGER'S RESPONSE TO YOUR INQUIRY ◆
DEAR MR. BILL FORD ( INQUIRER ID: inq0001   )

● DATE AND TIME OF INQUIRY: 2000/09/01  20:30   (INQUIRY NO.XXX000)
● E-MAIL ADDRESS INQUIRED THIS TIME: < before-change@old-isp.com >

! TO YOUR INQUIRY ABOUT E-MAIL ADDRESS, CHANGER DID NOT DISCLOSE NEW E-MAIL ADDRESS THIS TIME.
  YOU CAN NOT MAKE INQUIRY ABOUT THIS CHANGER AGAIN BECAUSE THIS CHANGER INSTRUCTS
  INQUIRY CENTER TO REFUSE RECEIPT OF YOUR INQUIRY ABOUT E-MAIL ADDRESS.

INQUIRY ABOUT E-MAIL ADDRESS COMES TO AN END.
WE HOPE YOU WILL NOT TAKE IT AMISS.

FIG. 32

SENDER: ADDRESS INQUIRY CENTER
< info@center.com >

DESTINATION: BILL FORD
< inq0001@aa.center.com >

SUBJECT: NOTICE OF CHANGER'S RESPONSE TO YOUR INQUIRY

◆ NOTICE OF CHANGER'S RESPONSE TO YOUR INQUIRY ◆
DEAR MR. BILL FORD ( INQUIRER ID:inq0001    )

● DATE AND TIME OF INQUIRY: 2000/09/01  20:30  (INQUIRY NO.XXX000)
● E-MAIL ADDRESS INQUIRED THIS TIME: < before-change@old-isp.com >

IN RESPONSE TO YOUR INQUIRY ABOUT E-MAIL ADDRESS, CHANGER DISCLOSED NEW E-MAIL ADDRESS.
 NEW E-MAIL ADDRESS IS AS FOLLOWS.

< after-change@new-isp.com >
                                             ↙ 24

INQUIRY ABOUT E-MAIL ADDRESS COMES TO AN END.

ADDRESS INQUIRY SYSTEM, COMPUTER SOFTWARE PRODUCT, AND ADDRESS INQUIRY METHOD

BACKGROUND OF THE INVENTION

1. Field of the Invention

The present invention relates to an address inquiry system, a computer software product, and an address inquiry method, for example, used when one, who gets access to an old address of a changer who has changed his or her address and cannot communicate with the changer, inquires about a new address of the changer.

2. Description of the Related Art

When two persons or corporations who are away from each other communicate with each other bi-directionally or uni-directionally, the other party concerned in communication is generally specified by the use of some address. When this address is wrong, the communication with the aforesaid other party is impossible.

In some cases, however, the address of the other party is unknown because the other party has moved. Therefore, various means for disclosing a new address of a new location to an inquirer have been hitherto provided.

In the case of a telephone number, for example, it is possible to automatically inform one who got access to an old telephone number about a new telephone number of a new location for a fixed period of time.

Even when the old telephone number is unknown, a paper telephone directory (the Yellow Page or White Page), commercially available package software thereof, and the like are given as means for searching someone's telephone number from his or her name and the like. If such means are used, anyone can know a new telephone number of a new location as far as the telephone number is registered.

Also regarding a mail address, an electronic mail address, (hereinafter defined as an e-mail address in this embodiment) a home page address (URL), and the like in addition to the telephone number, the similar listing service is provided, and a desired address can be known without any limitation as far as the address is registered in the list.

Incidentally, in the case of a mail address, mail is only forwarded to a registered new address without a post office disclosing the new address to a sender. Therefore, in this case, it is necessary for a receiver of the mail to inform the sender of the mail about the new address on another occasion.

According to the aforesaid conventional services, however, the following problems of various sorts which need to be solved exist.

(1) In most of conventional services, as described in Japanese Laid-open Patent No. 11-74931, a new address of a changer is disclosed to an inquirer unconditionally or by the input of a password if the inquirer inquires about an old address of the changer and the said old address is registered. Namely, in such services, the new address can be reported or not be reported depending on a password and the like, but it is impossible to selectively inform the inquirers about the new address depending on individual inquirers.

(2) In the services like this, the changer side cannot know when or to whom the new address is disclosed.

(3) Conventionally, to notify a third party of change information about a URL of a home page, it is necessary to notify him or her of a URL (a new address) of a new home page on the old home page. Therefore, the domain name of the old home page and a contract with an Internet service provider needs to be maintained, which causes a problem that the cost thereof needs to be borne during the notification of change information.

(4) When change information about a telephone number or mail address is given, there is a limit in terms of a period to the present service of a telephone office or a post office.

(5) In the case of mail service, the receiver needs to inform a sender of mail delivered to the old address about the new address on another occasion by himself or herself as described above.

(6) Meanwhile, in transport by the majority of private companies, it is impracticable to make a forwarding request to all of transport companies, and moreover, some private companies do not accept such a request.

(7) Addresses sometimes cease to be used for some reason. Namely, the use of the addresses themselves is sometimes stopped without the telephone number being changed. In this case, since the conventional service handles only addresses of the same sort, some who know only the telephone number cannot know other addresses of the changer.

SUMMARY OF THE INVENTION

An object of the present invention is to provide a new address inquiry system with a high degree of freedom in compliance with the wishes of a changer and an inquirer who inquires about a new address of the changer.

To solve the aforesaid problems, according to a first aspect of the present invention, an address inquiry system for informing an inquirer of a new address of a changer based on an old address of the changer via an Internet, comprising: a data base relationally storing at least the old address, the new address, and an address disclosing condition capable of setting a condition whereby the changer judges whether to give permission to disclose the new address; a means for searching the new address and the address disclosing condition corresponding to the old address from the data base when the inquirer sends an inquiry including the old address; a means for making the changer confirm whether the new address is disclosed when the address disclosing condition in searching includes the set condition; and a means for informing the inquirer of the new address when the changer permits the disclosure of the new address is provided.

According to the present invention, it is possible to make the changer judge whether to give permission to disclose the new address, which makes it possible to inform only inquirers desired by the changer about the new address of the changer.

According to a second aspect of the present invention, a system for making an inquiry about an address, comprising: an address data base, in which a registrant registers his or her own address, relationally storing an address disclosing condition for an inquirer who wishes to know the address of the registrant; a disclosure judging means for judging whether to disclose the address to the inquirer based on the address disclosing condition when the inquirer makes an inquiry about the address of the registrant; and an address disclosing means for disclosing the address of the registrant to the inquirer if the disclosure judging means judges that the address is disclosed is provided.

According to the present invention, various responses can be given to the inquiry about the address from the inquirer in accordance with the address disclosing condition set by the registrant (for example, a changer who changed his or her old address to a new address) which registered his or her own address. For example, depending on inquirers, various sorts of settings, for example, refusal of an inquiry from the said inquirer, unconditional disclosure of the address, confirmation by the registrant, and the like can be made, and moreover they can be automatically executed.

According to a third aspect of the present invention, a computer software product for instructing a computer system to inquire of a system for making an inquiry about an address, comprising: a storage medium; and an inquiry instructing means, stored in the storage medium and started based on the return of an e-mail because its destination is unknown, for instructing the computer system to inquire of the system for making the inquiry about an e-mail address of an addressee of the e-mail is provided.

According to the present invention, the inquiry instructing means is started based on the receipt of a notice of non-delivery of the e-mail by e-mail software installed in the computer, for example, which makes it possible to inquire of the system according to the first or the second aspect about the address by using the e-mail address related to the non-delivery.

According to a fourth aspect of the present invention, a computer software product for instructing a computer system to inquire of a system for making an inquiry about an address, comprising: a storage medium; and an inquiry instructing means, stored in the storage medium and started based on the impossibility of display of a home page because its destination is unknown, for instructing the computer system to inquire of the system for making the inquiry about the address of the home page is provided.

According to the present invention, the inquiry instructing means is started based on the receipt of a notice of the refusal of a request for display of a URL by a browser installed in the computer, for example, which makes it possible to inquire of the system according to the first or the second aspect about the address by using an old URL related to the impossibility of display.

According to a fifth aspect of the present invention, a method for inquiring about an address of a registrant, comprising: an inquiry receiving step of receiving an inquiry about the address of the registrant from an inquirer; a registration judging step of judging whether the registrant is registered in an address data base; a disclosure judging step of judging whether the address is disclosed to the inquirer based on a predetermined disclosing condition when the registrant is registered in the address data base; and an address disclosing step of disclosing the address of the registrant to the inquirer if it is judged that the address is disclosed in the disclosure judging step is provided.

According to aforesaid configuration, the system according to the first or the second aspect can be executed.

These objects and still other objects and advantages of the present invention will become apparent upon reading the following specification when taken in conjunction with the accompanying drawings.

BRIEF DESCRIPTION OF THE DRAWINGS

FIG. 6 shows an example of an interface screen for explaining the registration of the changer information;

FIG. 9 shows an example of the interface screen for explaining the registration of the changer information;

FIG. 10 shows an example of the interface screen for explaining the registration of the changer information;

FIG. 12 shows an example of an interface screen for explaining the registration of inquirer information;

FIG. 14 shows an example of the interface screen for explaining the registration of the inquirer information;

FIG. 15 shows an example of the interface screen for explaining the registration of the inquirer information;

FIG. 19 shows an example of the interface screen for explaining the inquiry process in which the special-purpose software for inquiry is used;

FIG. 20 shows an example of the interface screen for explaining the inquiry process in which the special-purpose software for inquiry is used;

FIG. 24 shows an example of the interface screen for explaining the inquiry operation by the address inquiry system;

FIG. 25 shows an example of the interface screen for explaining the inquiry operation by the address inquiry system;

FIG. 26 shows an example of the interface screen for explaining the inquiry operation by the address inquiry system;

FIG. 27 shows an example of the interface screen for explaining the inquiry operation by the address inquiry system;

FIG. 28 shows an example of the interface screen for explaining the inquiry operation by the address inquiry system;

FIG. 29 shows an example of the interface screen for explaining the inquiry operation by the address inquiry system;

FIG. 31 shows an example of the interface screen for explaining the inquiry operation by the address inquiry system; and FIG. 32 shows an example of the interface screen for explaining the inquiry operation by the address inquiry system.

DETAILED DESCRIPTION OF THE PREFERRED EMBODIMENT

A Preferred embodiment of the present invention will be explained below with reference to the drawings.

Figure 1:
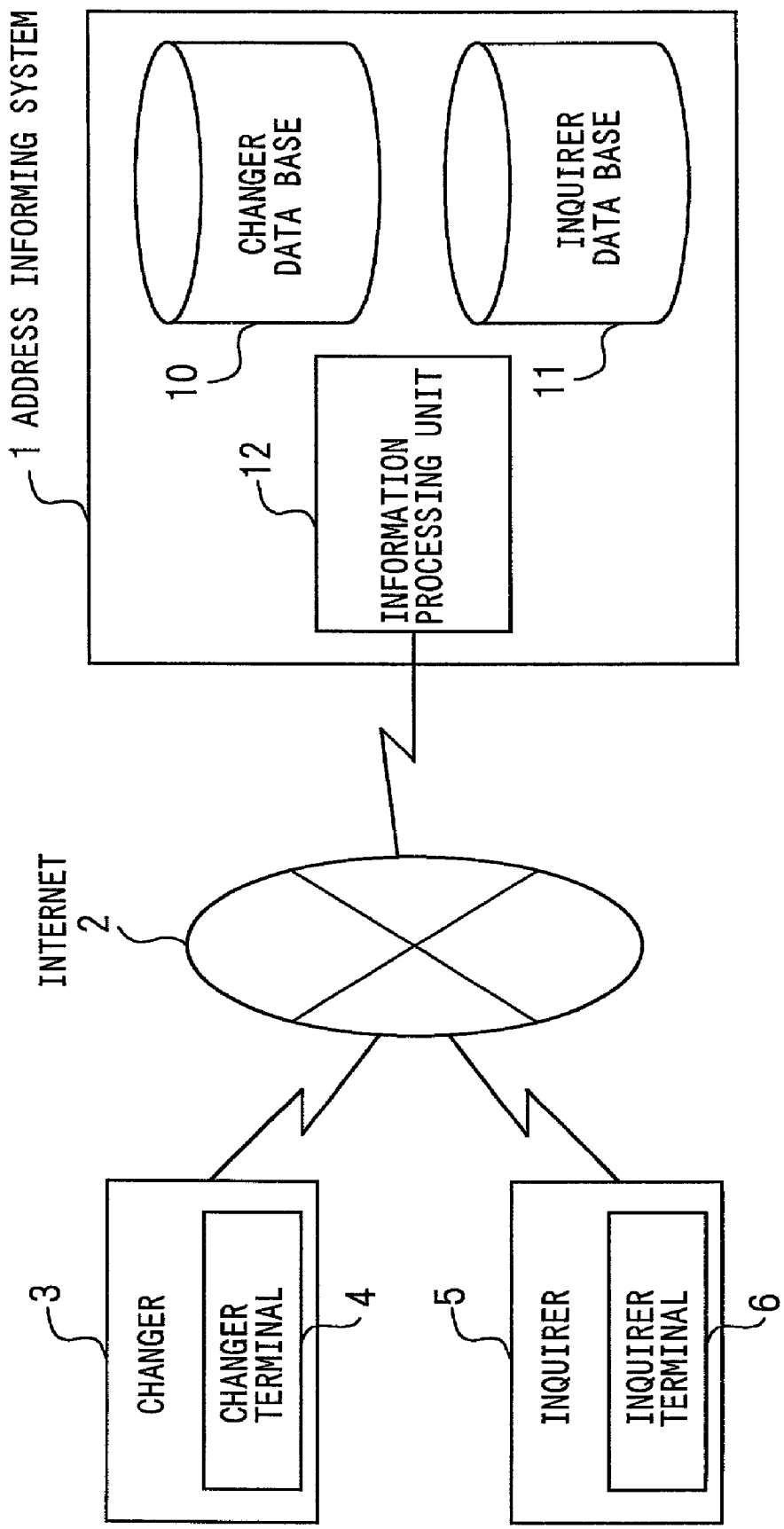
FIG. 1 is a schematic diagram showing the entire configuration of an embodiment of the present invention.

As shown in FIG. 1, an address inquiry system 1 according to this one embodiment is connected to an Internet 2 and structured to be able to bi-directionally communicate with a terminal (a changer terminal 4) of a changer 3 and a terminal (an inquirer terminal 6) of an inquirer 5.

The changer 3 is defined here as an individual or a corporation (hereinafter defined as an individual in this embodiment) who has moved, for some reason, from an old address to a new address, has changed his or her own address from the old address to the new address, or has stopped the use of the old address. The inquirer 5 is defined here as an individual or a corporation (hereinafter defined as an individual in this embodiment) which inquires about the new address of the changer 3 since an access by the old address of the changer 3 is refused in transmitting e-mail, requesting data, and the like to the old address.

Further, an address is defined here as information for specifying a position of his or her own in communication by the use of existing communication means, and an e-mail address, an IP address, a URL, a telephone number, a mail address, and the like are given as its examples. When these addresses are unknown or incorrect, it is impossible to communicate with the other party through the use of their corresponding communication systems.

An object of the present is to provide the address inquiry system 1 capable of flexibly coping with an intention of the changer 3 when the inquirer 5 inquires about the new address based on the old address of the changer 3.

Elements of this embodiment will be explained below in detail.

This address inquiry system 1 is mainly composed of a changer data base 10 storing information about the changer 3, an inquirer data base 11 storing information about the inquirer 5 who inquires about the new address, and an information processing unit 12 processing the inquiry from the inquirer 5 based on the information stored in these data bases 10 and 11.

These elements will be explained below.

(Changer Data Base)

Figure 2:
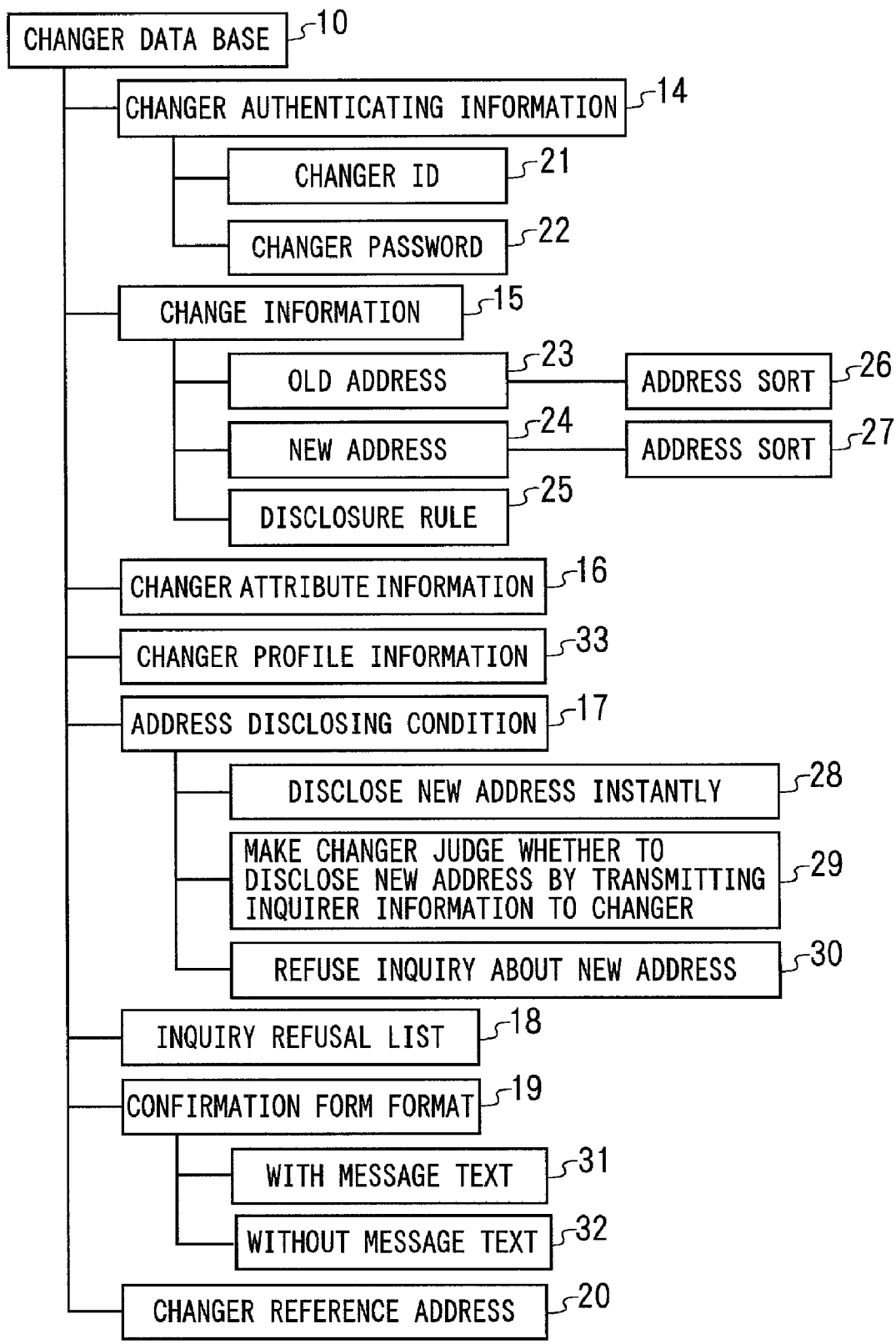
FIG. 2 is a block diagram showing the configuration of a changer database.

As shown in FIG. 2, the changer data base 10 stores a changer authenticating information 14 including a changer ID 21 and a changer password 22 for specifying the changer 3, change information 15 including one, or two or more old addresses 23 and a new address 24, a changer attribute information 16 storing the property of the changer 3, a changer profile information 33 for characterizing the changer 3, an address disclosing condition 17 storing responses depending on the inquirers 5, an inquiry refusal list 18 storing a list of the inquirers 5 who are refused an inquiry, a confirmation form format 19 which is sent to the changer 3 to confirm whether the new address 24 is disclosed or not, and a changer reference address 20 (an e-mail address) provisionally assigned to the changer 3.

The changer authenticating information 14 such as the changer ID 21 and the changer password 22 is information required for security when information is registered or changed in the changer data base 10 and issued to the changer 3 who has registered the new address 24 and the like in the address inquiry system 1.

The change information 15 is composed of a disclosure rule 25 in addition to the old address 23 and the new address 24 described above. The sorts of addresses which can be registered in this embodiment are four sorts such as an e-mail address, a home page URL, a telephone number, and an address, and the changer 3 is requested to register the old address 23 and the new address 24 concerning at least one or more sorts out of the aforesaid sorts. In this embodiment, after the old address 23 and the new address 24, codes 26 and 27 denoting the sorts of these addresses are given (FIG. 2). Incidentally, two or more old addresses 23 or new addresses 24 may be registered per one sort.

Moreover, by setting the disclosure rule 25, the changer 3 can freely set the sort of the new address 24 to be disclosed when receiving an inquiry with the presentation of each old address 23. Namely, when any of the aforesaid four sorts of old addresses 23 is presented, the new address 24 different from the presented old address 23 in sort can be disclosed or a plurality of new addresses 24 can be disclosed. For example, such setting that a new e-mail address is disclosed when an inquiry with the presentation of an old telephone number is received, or a new e-mail address and a new home page URL are disclosed when an inquiry with the presentation of an old mail address is received can be performed.

The changer attribute information 16 is one in which the changer 3 previously registers information other than the old address 23 such as a name and an address capable of distinguishing and specifying the changer 3 himself or herself. The changer profile information 33 is one in which the changer 3 previously registers a profile other than the changer attribute information 16 such as a self-introduction capable of characterizing the changer 3. For example, in many cases, an e-mail address is composed by a combination of alphabets, numbers and symbols, and the like, and the owner thereof cannot be specified by this e-mail address only. Therefore, the changer attribute information 16 and the changer profile information 33 are useful information for confirming whether the owner of the address is the changer 3 of whom the inquirer 5 wishes to inquire.

Response patterns (the numerals 28 to 30 in FIG. 2) of this address inquiry system 1 in the case where an inquiry with the presentation of the old address 23 is received from the inquirer 5 are previously registered in the address disclosing condition 17. In this embodiment, the changer 3 can set a response by selecting one from the following three sorts of responses (1) to (3).

(1) "Disclose a new address instantly." (the numeral 28 in FIG. 2)

This response pattern means that the new address 24 is disclosed to the specific inquirer 5 or the inquirer 5 which fulfills a fixed condition without making the changer 3 confirm whether the new address 24 is disclosed or not. In this embodiment, the new address 24 is disclosed to all the inquirers 5 unconditionally by the selection of this item. Incidentally, it is suitable that a new address disclosure list is prepared and that the new address 4 is disclosed only to the inquirers 5 included in this list without the confirmation of the changer 3.

(2) "Make the changer 3 judge whether to disclose a new address by transmitting information about the inquirer 5 without disclosing the new address instantly." (the numeral 29 in FIG. 2)

This response pattern means that when the inquirer 5 which inquires about an address fulfills or does not fulfill a specific condition, the information of this inquirer 5 is transmitted to the changer 3 for confirmation. In this case, the changer 5 can judge whether to give permission to disclose the new address 24 after confirming who the inquirer 5 is, for what purpose the inquirer 5 requests the disclosure of the new address 24, and the like from the information about the inquirer 5.

(3) "Refuse an inquiry about a new address instantly." (the numeral 30 in FIG. 2)

This response pattern means that when the inquirer 5 which is going to inquire about an address fulfills or does not fulfill a specific condition, the inquiry about the address is automatically refused. Incidentally, in this embodiment, when this item is selected, inquiries from all the inquirers 5 are refused unconditionally.

Meanwhile, in this embodiment, by registering the inquirers 5, inquiries from whom the changer 3 wishes to refuse, in the inquiry refusal list 18, setting such that inquiries from the inquires 5 registered in this inquiry refusal list 18 are refused even when the pattern (1) or the pattern (2) is selected is possible.

It is possible to previously register the other parties, inquiries from whom the changer 3 wishes to refuse, in the inquiry refusal list 18. In this embodiment, however, also when the response of "Do not disclose new address, and refuse inquiry from this inquirer hereafter" (See the hyperlink 112 in FIG. 23) is selected when the changer 3 makes a judgment in the pattern (2), an e-mail address of this inquirer 5 is automatically registered in the inquiry refusal list 18.

In this embodiment, the respective responses of the patterns (1) to (3) can be set in each of the registered old addresses 23. For example, it is possible that when an inquiry about the new address 24 with the presentation of an old home page URL is received, "Disclose a new address instantly" (the pattern (1)) is selected, and that when an inquiry with the presentation of an old telephone number is received, the response of "Make a changer judge whether to disclose a new address by transmitting information about an inquirer without disclosing the new address instantly." (the pattern (2)) is sent through the address inquiry system 1.

Meanwhile, in the confirmation form format 19, the format of the confirmation form for the permission of disclosure sent from the address inquiry system 1 to the changer 3 can be set in the case of the response pattern (2). Namely, in this embodiment, as will be explained later, the inquirer 5 first makes out an inquiry message for the address inquiry system 1, and the address inquiry system 1 draws up the confirmation form for the changer 3 based on this inquiry message. It is possible to include an important matter (a message text and the like) from the inquirer 5 in this confirmation form. In the confirmation form format 19, "with message text" 31 or "without message text" 32, which means that a message text included in an inquiry message from the inquirer 5 is included or not included in the confirmation form for the changer 3, can be selected.

As will be explained later, even if the "without message text" 32 is set in the confirmation form format 19, the changer 3 can obtain the message text from the inquirer 5 by e-mail later.

The changer reference address 20 is an e-mail address issued by the address inquiry system 1 to exchange communications including the confirmation form with the changer 3, and issued when the changer 3 has no e-mail address or does not want to use its own e-mail address even if he or she has the address, or issued for ensuring security.

(Inquirer Data Base)

Figure 3:
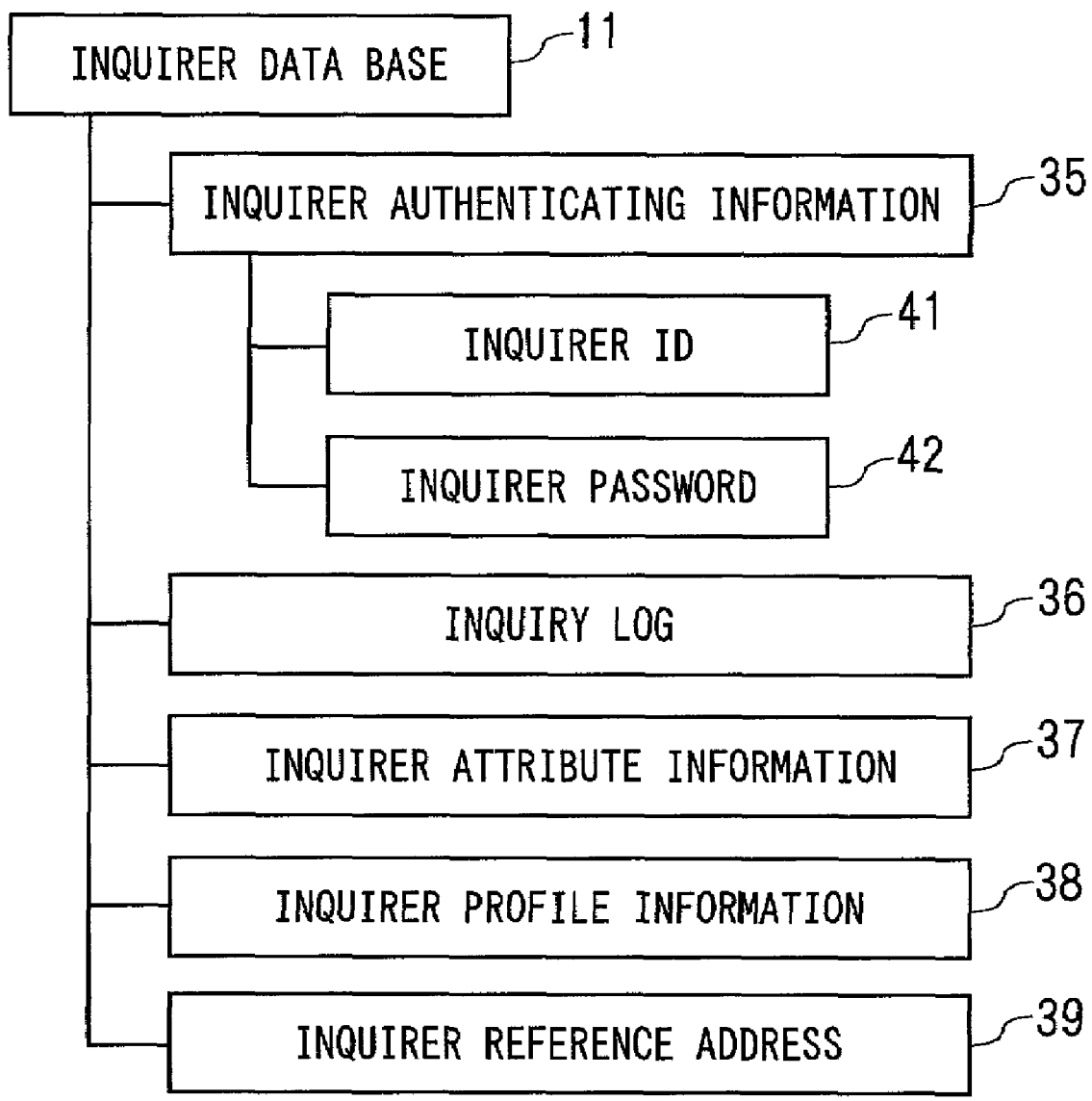
FIG. 3 is a block diagram showing the configuration of an inquirer data base.

Meanwhile, as shown in FIG. 3, the inquirer data base 11 stores an inquirer authenticating information 35 composed of an inquirer ID 41 and an inquirer password 42 for authenticating the inquirer 5, an inquiry log 36, an inquirer attribute information 37, an inquirer profile information 38, an inquirer reference address 39, and the like.

The inquirer authenticating information 35 such as the inquirer ID 41 and the inquirer password 42 is necessary information in terms of security when a demand for the search for the new address 24 from the inquirer 5 is executed and its result is confirmed.

The inquiry log 36 is information for monitoring an inquiry process by the inquirer 5, and for example, utilized for confirming whether a response from the changer 3 to the confirmation is within a predetermined period.

The inquirer attribute information 37 is information about the inquirer 5 presented to the changer 3 for making the changer 3 confirm whether the new address 24 is disclosed to the inquirer 5. In this embodiment, this inquirer attribute information 37 is composed of a name, an address (an e-mail address, a telephone number) and the like of the inquirer 5.

The inquirer profile information 38 is a brief composition of introduction for characterizing the inquirer 5 and registered to characterize the inquirer 5 in making the changer 3 confirm whether to disclose the new address 24. The registration of the inquirer profile information 38 is left to the discretion of the inquirer 5, but it is desirable to persuade the inquirer 5 to register it as much as possible since there is a case where the changer 3 refuses the disclosure of the new address 24 since the inquirer 5 is not identified only by an e-mail address and the like.

The inquirer reference address 39 is an e-mail address issued by the address inquiry system 1 to exchange communications including the inquiry message with the inquirer 5, and issued when the inquirer 5 has no e-mail address or does not want to use its own e-mail address even if he or she has the address, or issued for ensuring security.

(Information Processing Unit)

Next, the information processing unit 12 will be explained.

Figure 4:
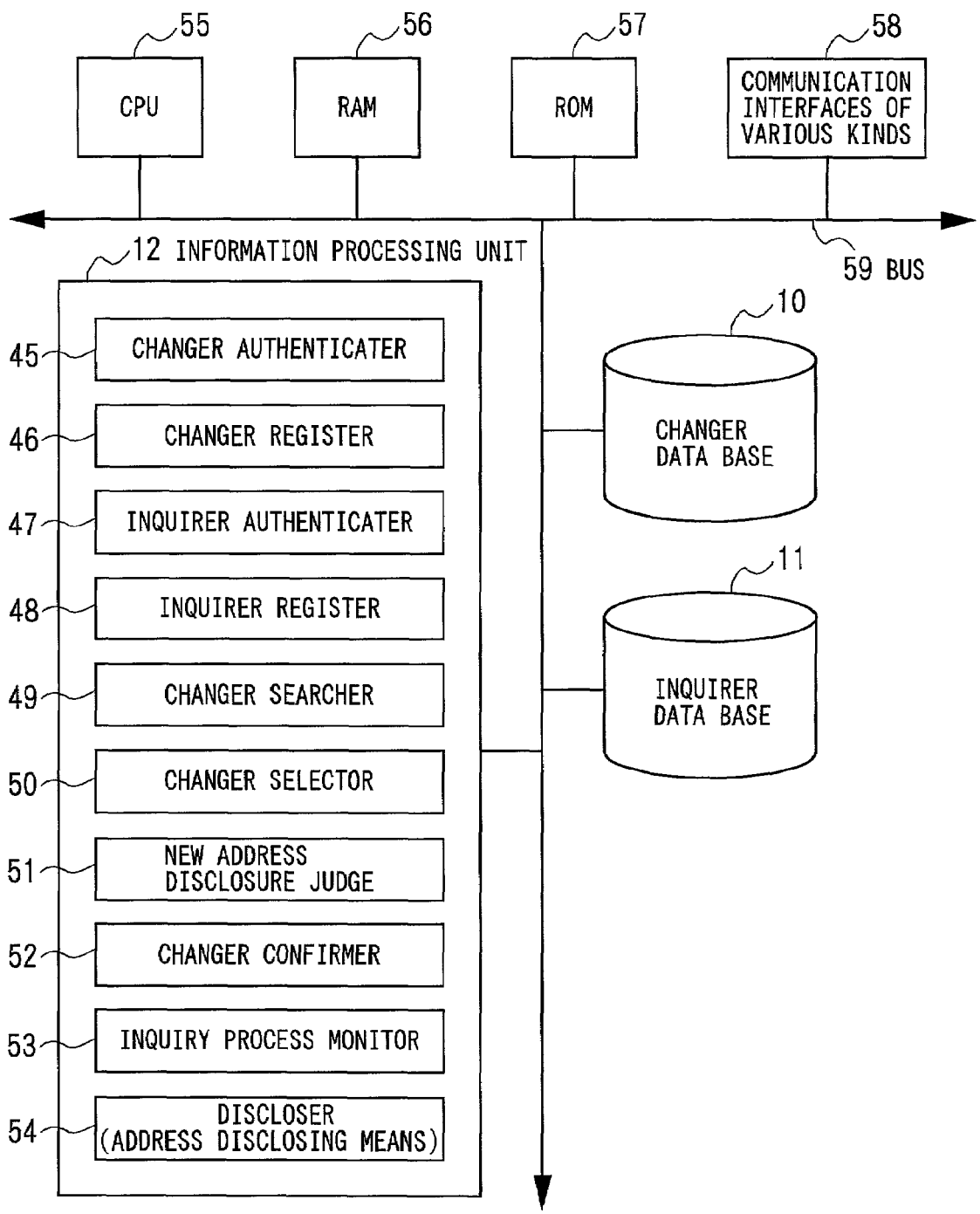
FIG. 4 is a schematic block diagram showing an address inquiry system.

FIG. 4 is a diagram showing the entire configuration of the address inquiry system 1 including this information processing unit 12. The information processing unit 12, the changer data base 10, and the inquirer data base 11 are connected to a bus 59 to which a CPU 55, a RAM 56, a ROM 56, and communication interfaces 58 of various kinds are connected.

As shown in FIG. 4, the information processing unit 12 of the address inquiry system 1 is composed of a changer authenticator 45 authenticating the changer 3, a changer register 46 receiving the change information 15 such as the new address 24 inputted by the changer 3 and storing it in the changer data base 10, an inquirer authenticator 47 authenticating the inquirer 5, an inquirer register 48 registering information about the inquirer 5 in the inquirer data base 11, a changer searcher 49 searching the changer data base 10 with the old address 23 of the changer 3 when the inquirer 5 inquires about the new address 24 of the changer 3, a changer selector 50 making the inquirer 5 select from the changers 3 on whom the inquiry about the new address 24 is executed when there exist plural changers 3 who fulfill the condition in the search, a new address disclosure judge 51 judging whether to disclose the new address 24 to the inquirer 5 based on the address disclosing condition 17 for the new address 24 of the changer 3, a changer confirmer 52 making the changer 3 confirm whether the new address 24 is disclosed or not, an inquiry process monitor 53 administering the period of each inquiry process, and a discloser 54 disclosing an inquiry result to the inquirer 5.

These elements 45 to 54, the changer data base 10, and the inquirer data base 11 are practically composed of computer programs installed in a storage medium of a computer system as shown in FIG. 4 and show various functions of the present invention by being read and executed in the RAM 56 by means of the CPU 55.

The detailed configurations and functions of the elements (45 to 54) will be explained below with reference to flowcharts and interface examples.

(Registration by Changer)

Figure 5:
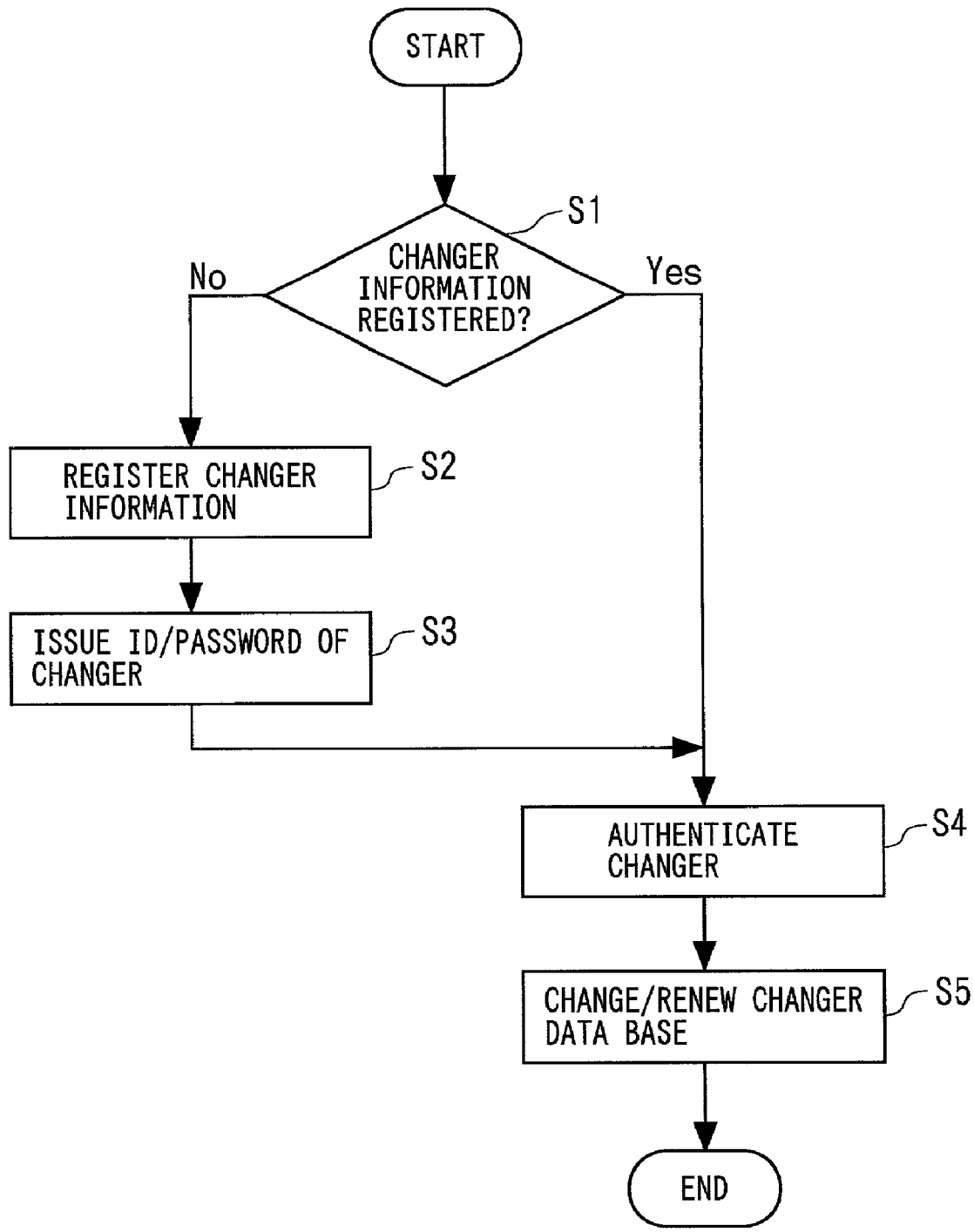
FIG. 5 is a flowchart showing the registration process of changer information.

FIG. 5 is a flowchart showing the registration process of changer information by the changer register 46 and the like.

The changer register 46 first judges whether the changer 3 concerned in an access has already registered changer information or not by inquiring of the changer data base 10 about it (step S1). When the changer information is registered for the first time, the changer register 46 receives the information, registers it in the changer data base 10 (step S2), and thereafter issues the changer ID 21 and the changer password 22 to the changer 3 (step S3).

Meanwhile, when the changer 3 wishes to changes information which has been already registered, the changer authenticator 45 authenticates an access through the use of the changer ID 21 and the changer password 22 by making inquiries at the changer data base 10 (step S4), and thus a change and a renewal of information in the changer data base 10 are permitted (step S5).

FIG. 6 to FIG. 10 show examples of an interface screen when changer information (See FIG. 2) in the changer data base 10 is registered. Although a series of registration processes are executed in connection with a Web site offered by the address inquiry system 1 in this example, registration may be performed by transmitting and receiving necessary information to/from the address inquiry system 1 by e-mail.

FIG. 6 is an example of an interface screen for registering the changer attribute information 16. The changer 3 inputs basic information such as a name 60, a present address 61, a telephone number 62, a FAX number 63, on this screen. The changer register 46 registers this information as the changer attribute information 16 (See FIG. 2). If the changer 3 wishes, the changer reference address 20 for receiving notice from the address inquiry system 1 is set and acquired through this screen. Incidentally, in registering basic information about the changer 3, individual registration or corporate registration can be selected, and an example of the individual registration is shown here.

Figure 7:
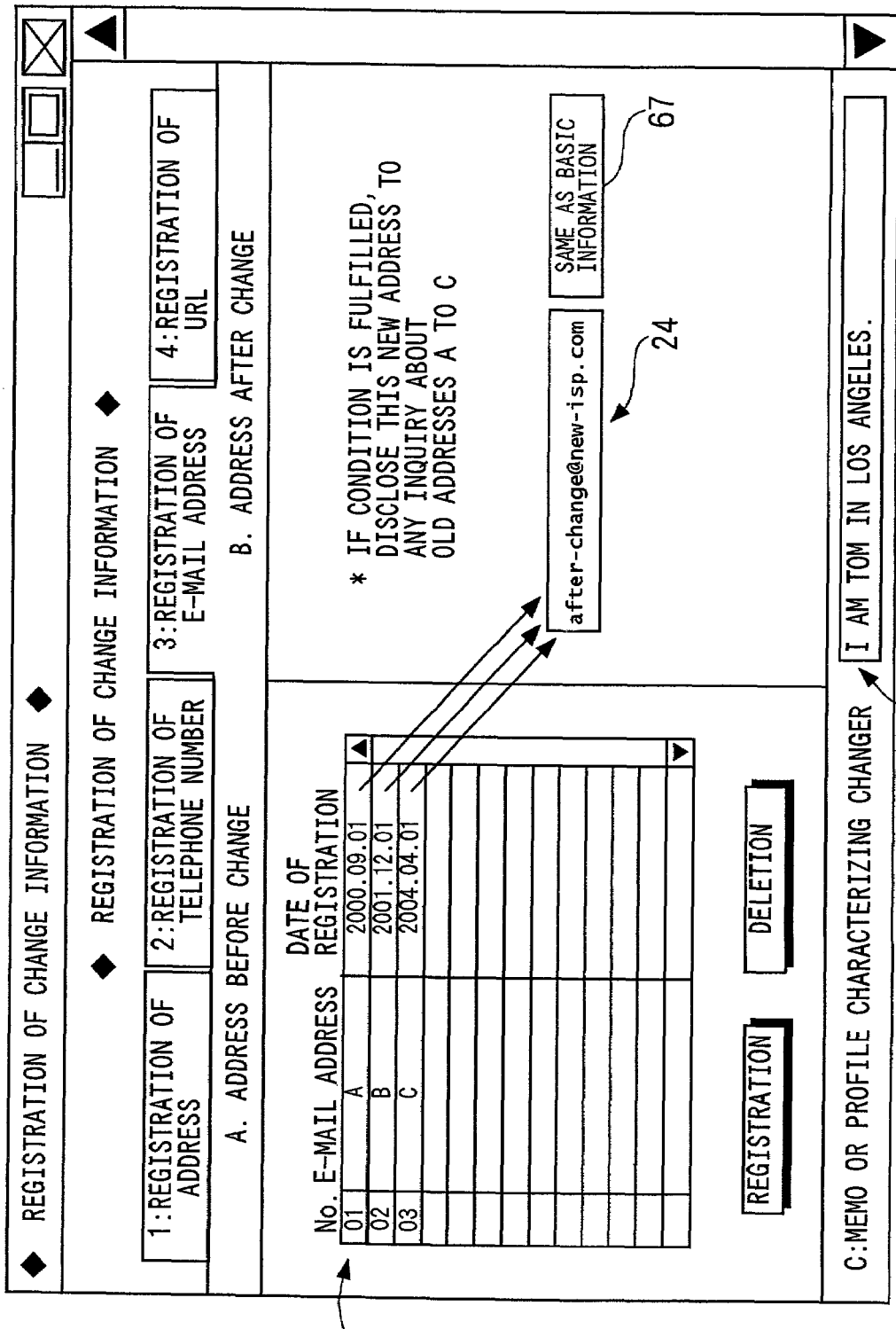
FIG. 7 shows an example of the interface screen for explaining the registration of the changer information.

When the registration of the basic information is completed, the changer register 46 displays an interface screen shown in FIG. 7. This screen is an interface for registering the old address 23 and the new address 24 to be disclosed based on the old address 23 from the change information 15, and FIG. 7 shows an example of a screen for an e-mail address.

The changer 3 registers an address before change (the old address 23) necessary for receiving an inquiry and an address after change (the new address 24) which is disclosed when there is an inquiry on this screen. In this embodiment, a plurality of (three in this embodiment) old addresses 23 can be registered and renewed at any time by the aforesaid process. When the new address 24 to be disclosed is the same as that in the basic information (the changer attribute information 16) registered in the interface in FIG. 6, a button of "Same as basic information" 67 is pressed, whereby the basic information is transferred and repeated input can be avoided.

The changer register 46 also accepts the changer profile information 33 in an input section shown by the numeral 68 in this screen. This changer profile information 33 is information given to the inquirer 5 to confirm and specify the other party (the changer 3) about whose address the inquirer 5 wishes to inquire as described above.

Figure 8:
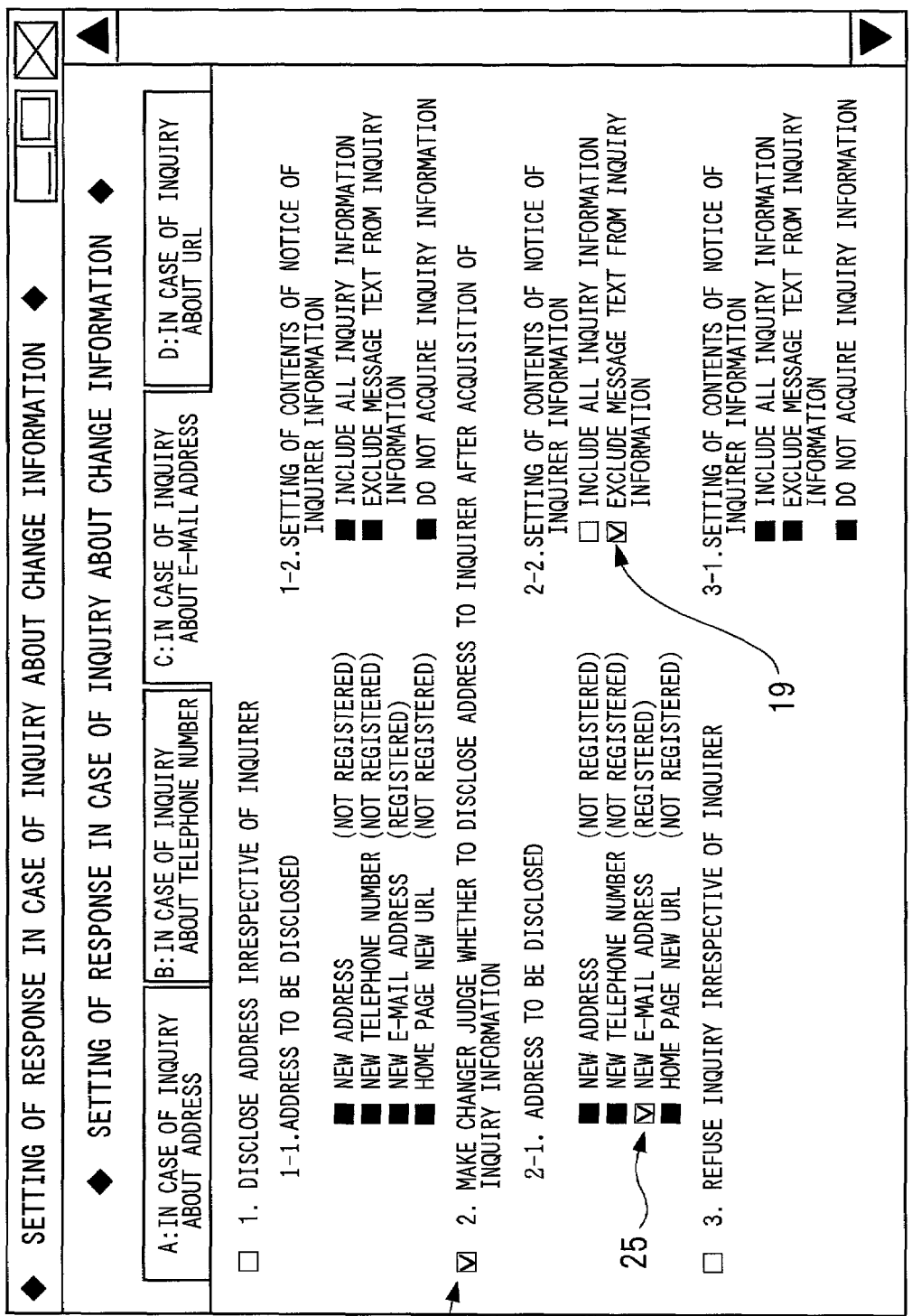
FIG. 8 shows an example of the interface screen for explaining the registration of the changer information.

Subsequently, the changer register 46 displays an interface screen shown in FIG. 8. This interface screen is to register and set the address disclosing condition 17, the disclosure rule 25, and the confirmation form format 19 from the information in the changer data base 10 shown in FIG. 2.

Namely, on this screen, the changer 3 registers the sort of the new address 24 to be disclosed to the inquirer 5 out of the registered new addresses 24 such as a new e-mail address and a new address, a condition of disclosure (including unconditional disclosure and unconditional non-disclosure) in the case where an inquiry is sent from the inquirer 5. The example in FIG. 8 shows the setting of the address disclosing condition 17, the disclosure rule 25, and the like when an inquiry with the presentation of an e-mail address as the old address 23 is sent.

In this example, "Make changer judge whether to disclose address to inquirer after acquisition of inquiry information (information about the inquirer 5)." (the pattern (2) shown by the numeral 29 in FIG. 2) is registered as the address disclosing condition 17, "New e-mail address" is registered as the sort of the new address 24 to be disclosed based on the e-mail address (the disclosure rule 25), and "Exclude message text (from the inquirer 5) from inquiry information (information about the inquirer 5)" is registered as the confirmation form format 19. The above information is registered in the changer data base 10 by the changer register 46.

Meanwhile, FIG. 9 is an example of a registration screen of the inquiry refusal list 18 (See FIG. 2).

On this screen, the changer 3 inputs conditions such as e-mail addresses of the inquirers from whom the changer 3 wishes to refuse inquiries. By pressing a "Registration" button 69 on this screen, these addresses are registered in the inquiry refusal list 18, and stored in the changer data base 10. Incidentally, this inquiry refusal list 18 can be renewed (added, deleted) at any time by the aforesaid process.

When the changer 3 finishes inputting changer information on each of the above screens, the changer register 46 displays a confirmation screen such as shown in FIG. 10. Incidentally, in order to confirm that the e-mail address registered by the changer 3 is owned by the changer himself or herself, it is suitable that the issued changer ID 21 is not displayed on this screen and that an e-mail notifying the completion of changer registration is separately transmitted from the address inquiry system 1 to the changer 3 to notify the changer ID 21 by this e-mail. Moreover, an e-mail in which the same contents are described may be transmitted to the changer 3 without displaying this confirmation screen (FIG. 10).

(Registration by Inquirer)

Figure 11:
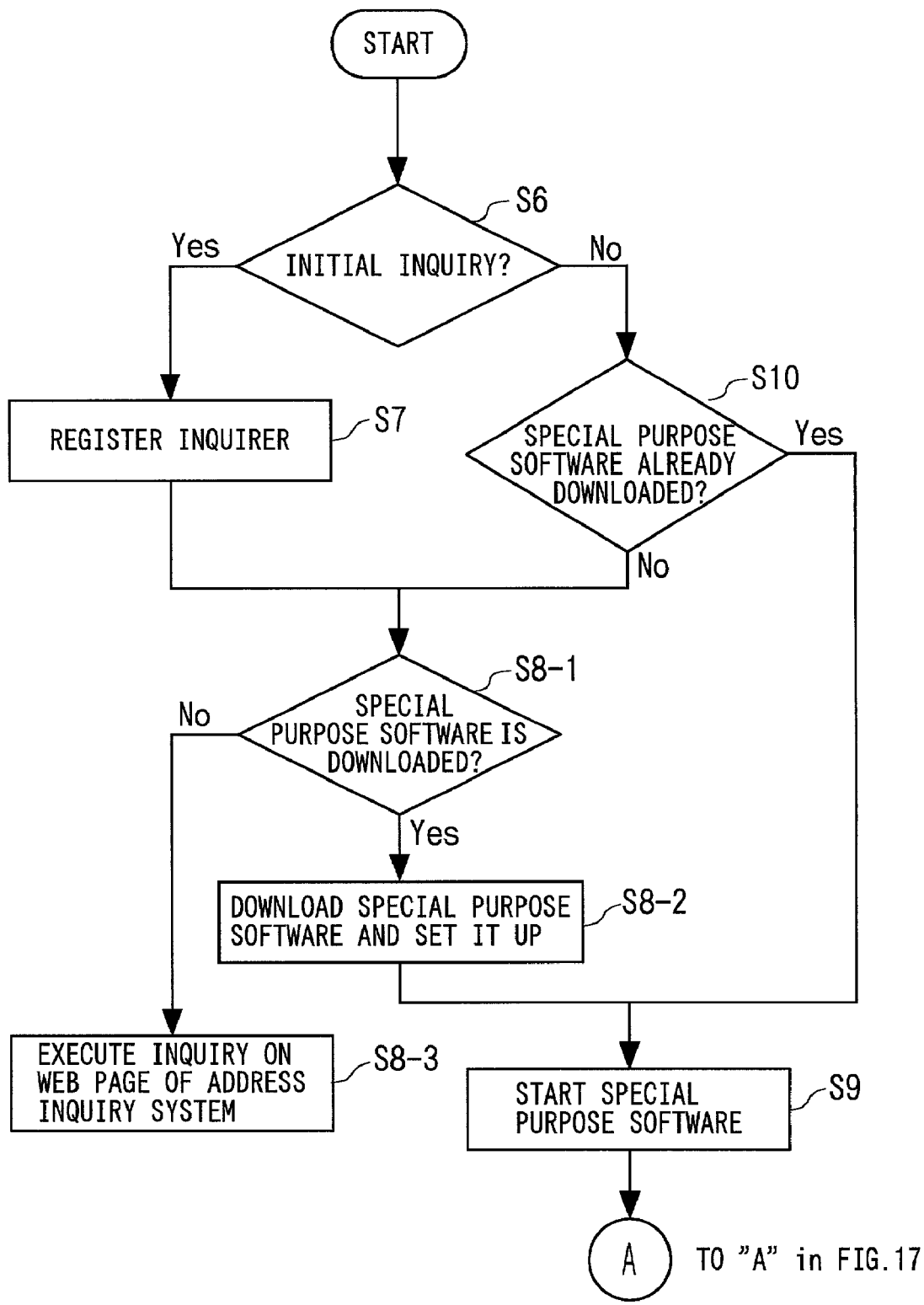
FIG. 11 is a first flowchart showing the process of registration of inquirer information and inquiry about a new address.

Next, the registration of inquirer information by the inquirer register 48 will be explained with reference to a flowchart shown in FIG. 11 and examples of an interface screen shown in FIG. 12 to FIG. 15. This registration of inquirer information is executed as a part of the process of an inquiry about the new address 24 from the inquirer 5.

Namely, the inquiry from this inquirer 5 is executed when the inquirer 5 cannot get access to the changer 3 when he or she sends an e-mail to the old address 23 without knowing the change thereof or tries to refer to a home page by an old URL address without knowing the change thereof.

The inquirer register 48 first judges whether an inquiry from the said inquirer 5 is his or her initial inquiry by inquiring of the inquirer data base 11 about it (step S6). When the inquirer 5 uses the address inquiry system 1 for the first time, that is, when the inquirer 5 inquires about an address for the first time, the inquirer register 48 accepts the registration of this inquirer 5 (step S7).

Figure 13:
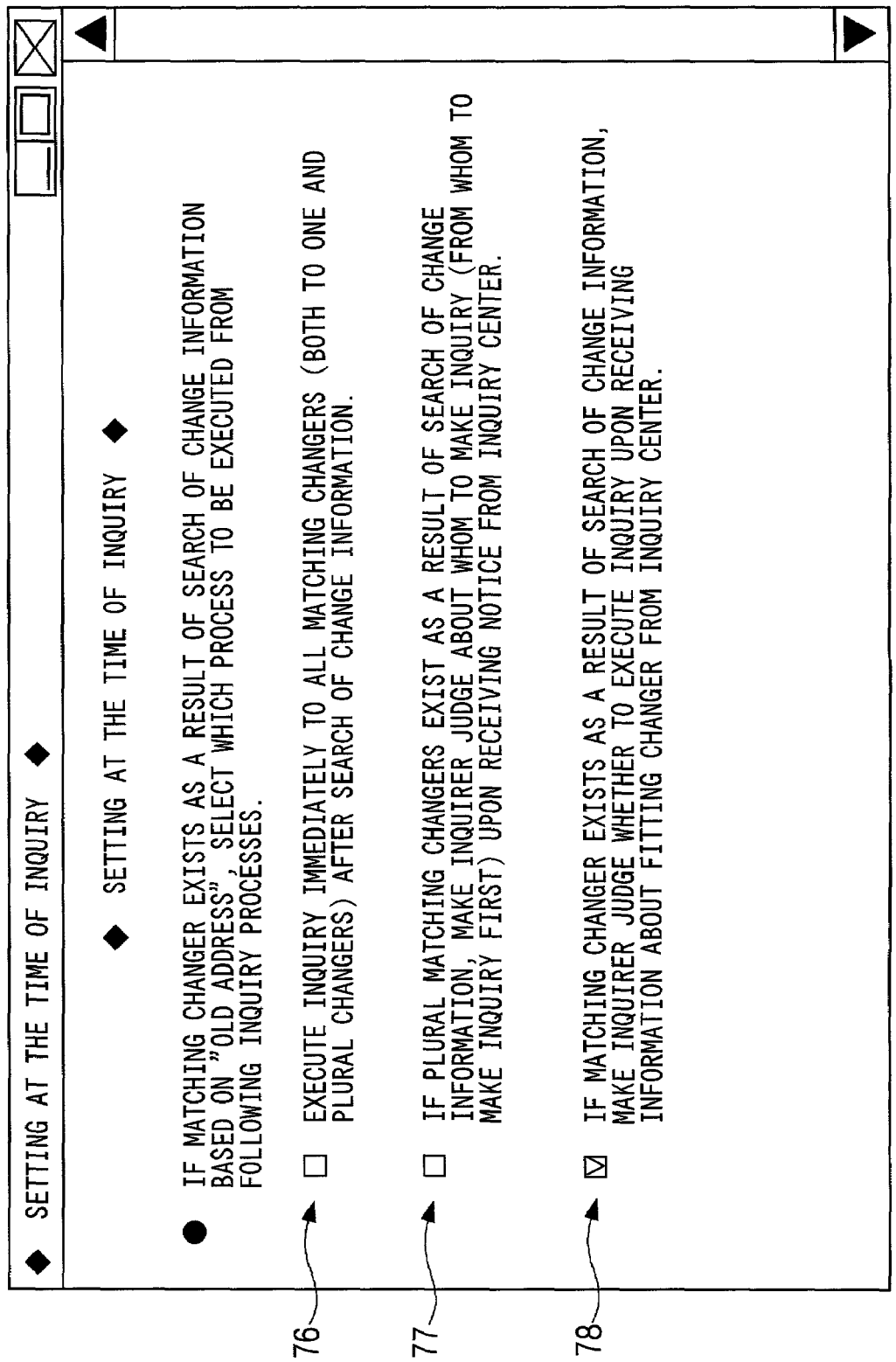
FIG. 13 shows an example of the interface screen for explaining the registration of the inquirer information.

FIG. 12 and FIG. 13 are examples of screens for accepting the registration of information about the inquirer 5.

FIG. 12 is an example of a screen in which the inquirer register 48 accepts the registration of attribute information of the inquirer 5, and the inquirer 5 registers basic information such as a name 70, an address 71, a telephone number 72, a FAX number 73 and sets and acquires the inquirer reference address 39 for receiving an inquiry result if he or she wishes. Incidentally, in registering the basic information about the inquirer 5, individual registration or corporate registration can be selected, and an example of the individual registration is shown here. The information inputted on this screen is registered as the inquirer attribute information 37 and the inquirer reference address 39 in the inquirer data base 11 (See FIG. 3).

Then, the changer selector 50 performs setting on receipt of a response to a search result on a screen shown in FIG. 13. Specifically, when the matching changers 3 are searched as a result of the search of the change information, it is selected that the inquiry is immediately made for (all) the matching changers 3 (a pattern shown by the numeral 76 in FIG. 13), that an inquiry is made after the selection of the changer 3 when a plurality of matching changers 3 are searched (a pattern shown by the numeral 77 in FIG. 13), or that the inquiry is made after a memo, a profile, or the like which characterizes the changer 3 is confirmed (a pattern shown by the numeral 78 in FIG. 13).

Thereafter, the inquirer register 48 displays a screen shown in FIG. 14 for the inquirer 5 which has acquired the inquirer reference address 39 on the registration screen of inquirer information in FIG. 12, and notifies him or her of account information.

After the completion of the aforesaid registration operations, the inquirer register 48 displays a screen of the completion of inquirer registration shown in FIG. 15. This screen shows a list of information contents inputted or selected by the inquirer 5 in order that the inquirer 5 confirms registration contents. Incidentally, an e-mail in which the same contents are described may be sent to the inquirer 5.

Thereafter, the address inquiry system 1 makes the inquirer 5 judge whether to download special-purpose software for assisting the inquiry about the address (step S8-1). When this special-purpose software is downloaded, the download and set-up thereof is executed in step S8-2.

Namely, after this special-purpose software is downloaded in the computer system of the inquirer 5, an installer is automatically started, and this software is installed in the inquirer terminal 6 at the request of the inquirer 5 (step s8-2). This special-purpose software is automatically started by recognizing that e-mail is returned because its destination is unknown or that a URL address is not found as will be explained later (step S9), and has a function of assisting an access to the address inquiry system 1 and the search for the new address 24.

Even if the inquirer 5 is not a person who sends an inquiry to the address inquiry system 1 for the first time (No in step S6), the special-purpose software is downloaded when it has not been downloaded yet (step S10). When the special software is not downloaded in the aforesaid step S8-1, subsequent processes are executed on Web page provided by the address inquiry system 1 (step S8-3). The inquiry process on this Web page is almost the same as the under-mentioned inquiry process by the use of the special-purpose software, and thus the explanation thereof is omitted.

(Inquiry by Inquirer)

Next, the process of an inquiry about the new address 24 by the use of the special-purpose software will be explained.

Figure 16:
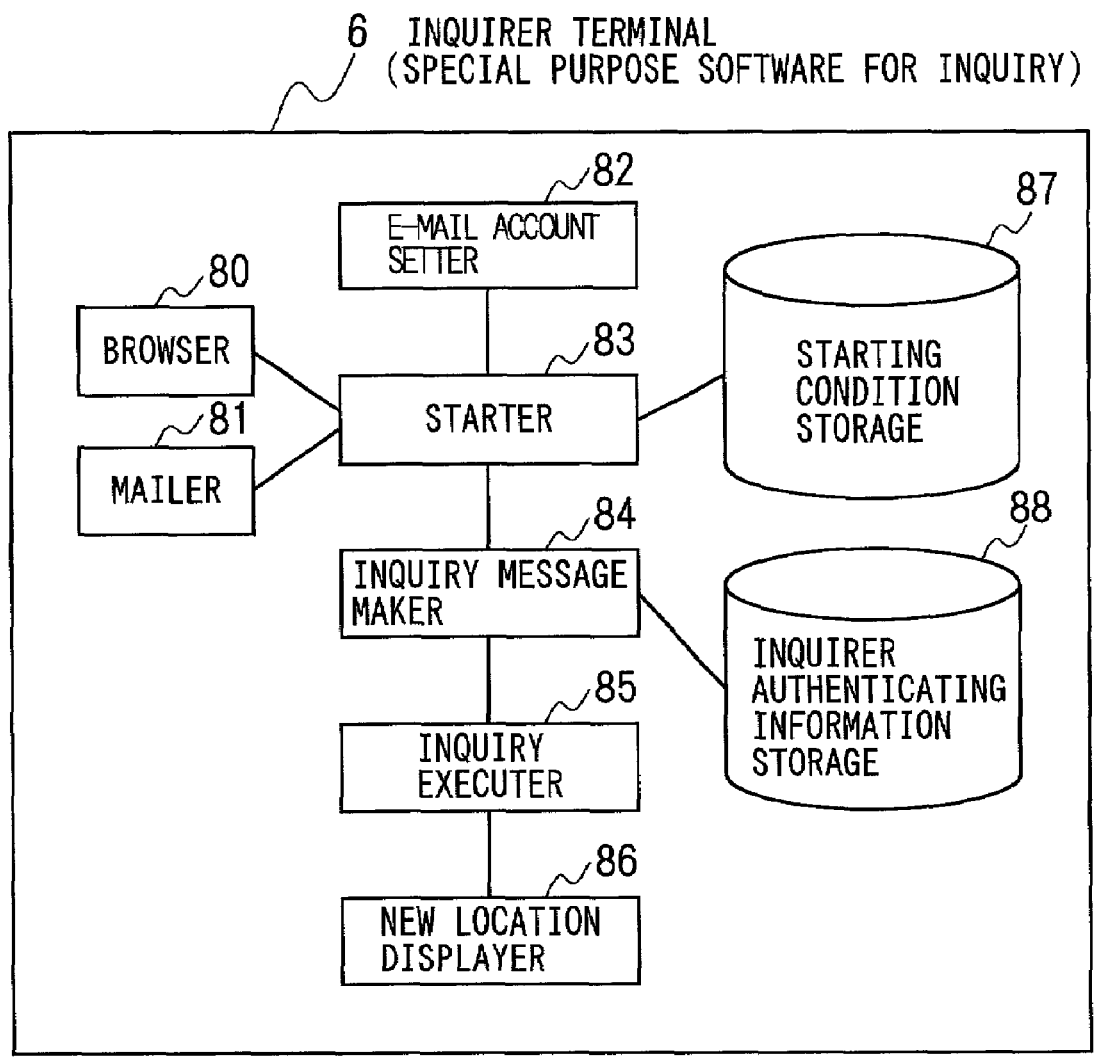
FIG. 16 is a block diagram showing the configuration of an inquirer terminal in which special-purpose software for inquiry is installed.

FIG. 16 is a schematic block diagram showing the inquirer terminal 6 in which the special-purpose software is installed in a storage medium such as a hard disk. FIG. 16 shows the configuration of only a software program related to the present invention, and the illustration of hardware such as a CPU and basic software such as an OS is omitted.

In the inquirer terminal 6 in which this software is installed, a browser 80 for browsing an Internet home page and a mailer 81 for transmitting and receiving e-mail are set up in advance. The aforesaid software has e-mail account setter 82 setting e-mail account of the inquirer reference address 39 in the mailer 81, a starter 83 starting this software based on the receipt of a notice that an address is unknown by the browser 80 and the mailer 81, an inquiry message maker 84 making out an inquiry message for the address inquiry system 1 based on information from the browser 80 and the mailer 81, an inquiry executor 85 logging in the address inquiry system 1 and registering the inquiry message, and a new location displayer 86 displaying a new location (for example, a home page) based on the acquisition of the new address 24 of the new location as the result of the inquiry.

The starter 83 and the inquiry message maker 84 operate based on starting conditions stored in a starting condition storage shown by the numeral 87 in FIG. 16. Namely, in the starting condition storage 87, starting conditions such that the browser 80 and the mailer 81 automatically starts this software based on the receipt of a notice that an access with presentation of the old address 23 is refused are stored depending on the sort of the browser 80 and the mailer 81 as described above.

Moreover, this software has an inquirer authenticating information storage 88 storing the inquirer authenticating information 35. The inquiry message maker 84 automatically takes in the inquirer authenticating information 35 from this inquirer authenticating information storage 88, and the inquiry executor 85 logs in the address inquiry system 1 by using the inquirer authenticating information 35.

The inquiry process of the new address 24 will be explained below by means of flowcharts in FIG. 17 and FIG. 22 and interface screen examples in FIG. 18 and the following figures.

Figure 17:
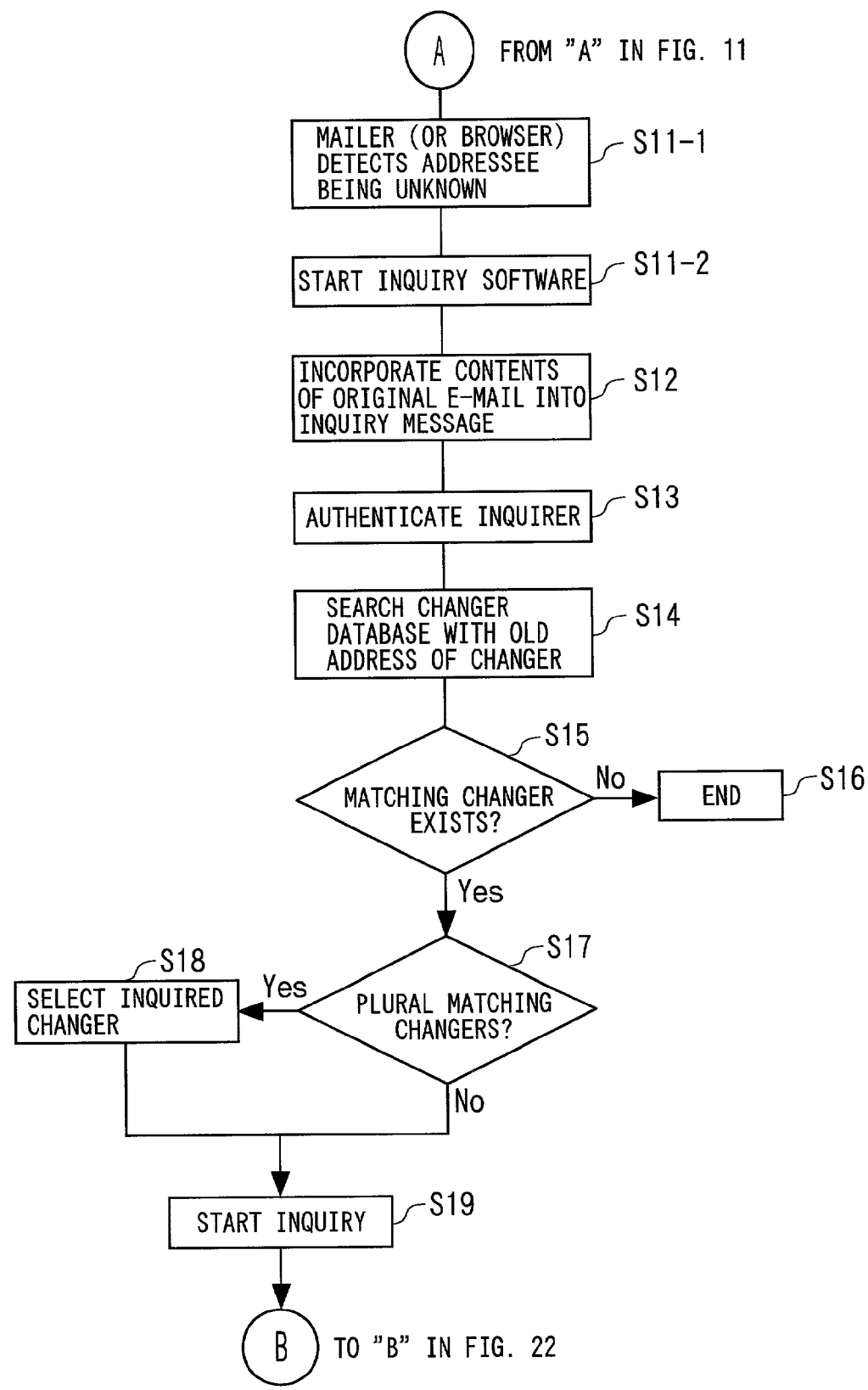
FIG. 17 is a second flowchart showing registration of inquirer information and the process of inquiry about the new address.

When the aforesaid special-purpose software is used, the starter 83 starts the inquiry message maker 84 based on the receipt of an e-mail of a non-delivery notice, in which a message that a destination is unknown is described, by the mailer 81 (steps S11-1 and S11-2 in FIG. 17). Incidentally, manual starting is also possible by changing starting conditions stored in the starting condition storage 87.

Figure 18:
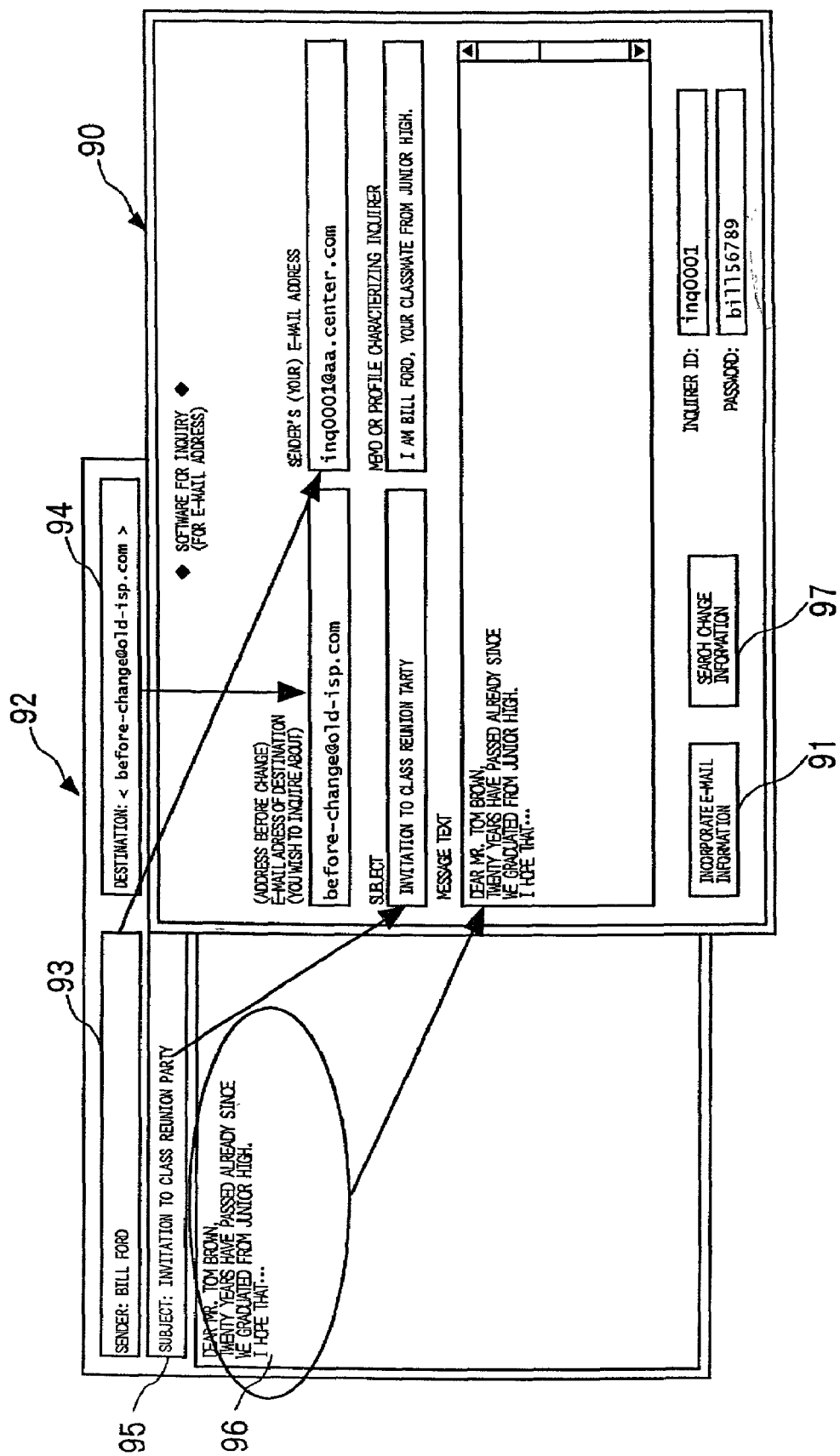
FIG. 18 shows an example of an interface screen for explaining the inquiry process in which the special-purpose software for inquiry is used.

FIG. 18 is a conceptual diagram showing operations at the time of the starting of inquiry software. The inquiry message maker 84 has functions of displaying an input screen for an inquiry message such as shown by the numeral 90 in FIG. 18 in the inquirer terminal 6 and transferring a sender 93, a destination 94, a subject 95, a message text 96, and the like out of the contents of original e-mail 92 attached to the non-delivery notice e-mail to the input screen in response to the click of a "Incorporate e-mail information" button 91 on this screen (step S12). It is possible to directly amend the inputted matters on this screen 90 when the inquirer 5 wants to supplement the information. Thus, the inquiry message to be sent to the address inquiry system 1 is made out.

If the making of the inquiry message is completed, the inquiry executor 85 is started by pressing a "Search change information" button 97 on the screen 90, and gets access to the address inquiry system 1, and logs in the system 1 using the inquirer authenticating information 35. Authentication on this occasion is executed by the inquirer authenticator 47 (see FIG. 4) of the system.

Figure 21:
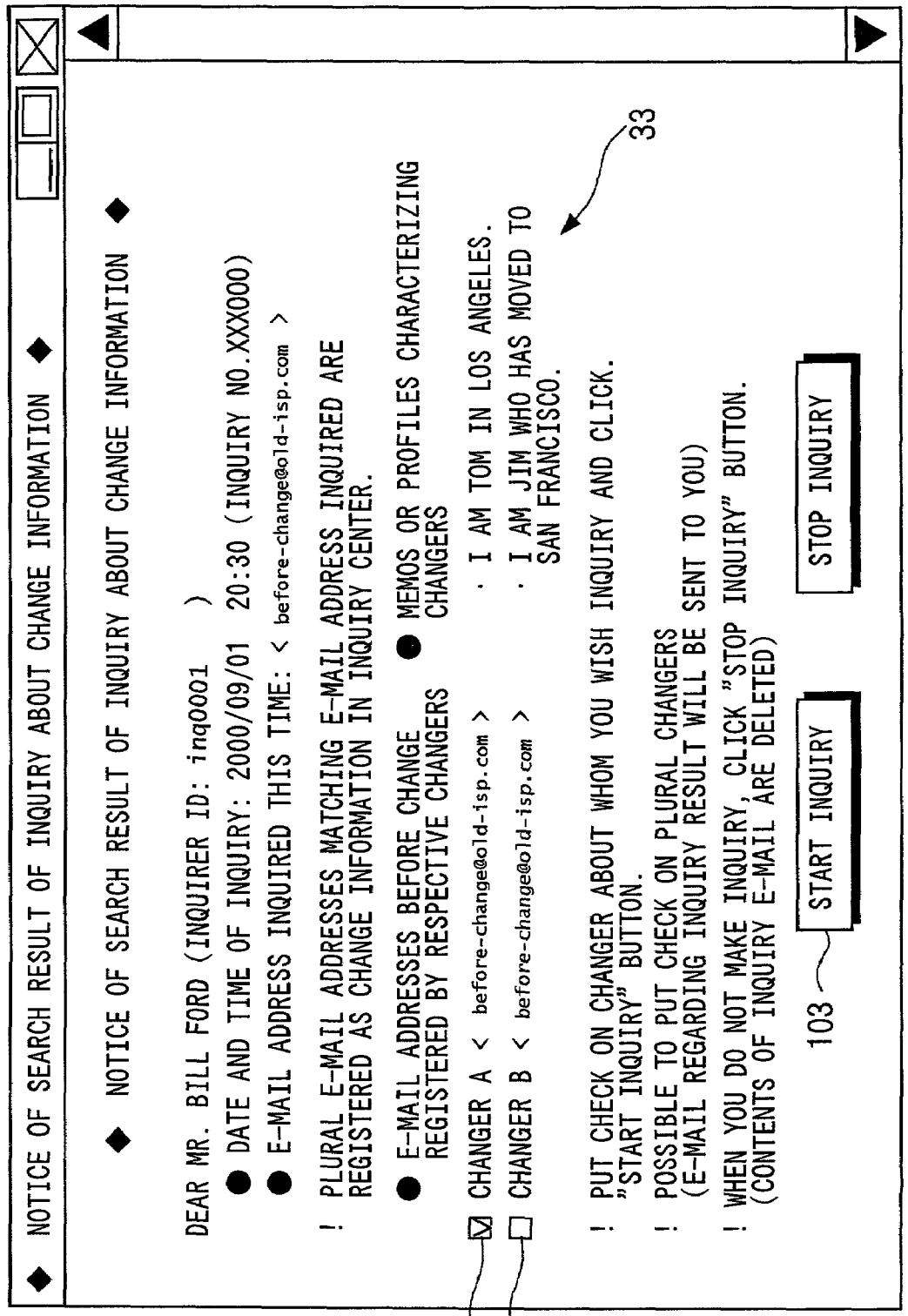
FIG. 21 shows an example of the interface screen for explaining the inquiry process in which the special-purpose software for inquiry is used.

When the authentication by the inquirer authenticator 47 is completed, the destination 94, that is, the old address 23 of the changer 3 out of the inquiry information is sent to the changer searcher 49. The changer searcher 49 searches the changer data base 10 by means of the received old address 23 (step S14). FIG. 19 to FIG. 21 show examples of interface screens for showing search results by the changer searcher 49 on the inquirer terminal 6.

FIG. 19 shows an example of a screen of a Web page for informing the inquirer 5 that as the result of a search of the changer data base 10 in the address inquiry system 1 for the old address 23 of the changer 3, the said address is not found (step S15). In this case, the inquiry about the corresponding new address 24 comes to an end at this stage (step S16).

Meanwhile, FIG. 20 shows an example of a screen of a Web page for informing the inquirer 5 that only one matching address is found as the result of the search of the change information 15. The changer searcher 49 displays the changer profile information 33 together with the old address 23 of the changer 3, whereby the inquirer 5 can judge whether the owner of this old address 23 is the changer 3 about whose new address 24 the inquirer 5 wishes to inquire. When he wishes an inquiry, a "Start inquiry" button 100 is pressed (steps S17 and S19).

FIG. 21 shows an example of a screen of a Web page of the address inquiry system 1 informing the inquirer 5 that a plurality of matching addresses are found as the result of the search of the change information 15. In this case, the inquirer 5 can select the changer 3 about whose new address 24 the inquirer 5 wishes to inquire with reference to the changer profile information 33 (the changer attribute information 16) of the changer 3. By pressing a "Start inquiry" button 103 after the selection of the changer 3 by the use of check boxes 101 and 102, an inquiry about the new address 24 of the changer 3 can be started (step S17 to S19).

Incidentally, the communication between the changer 3 and the inquirer 5, and the address inquiry system 1 can be performed by e-mail, in which case it is possible to use the changer reference address 20 and the inquirer reference address 39 which are assigned by the address inquiry system 1.

Figure 22:
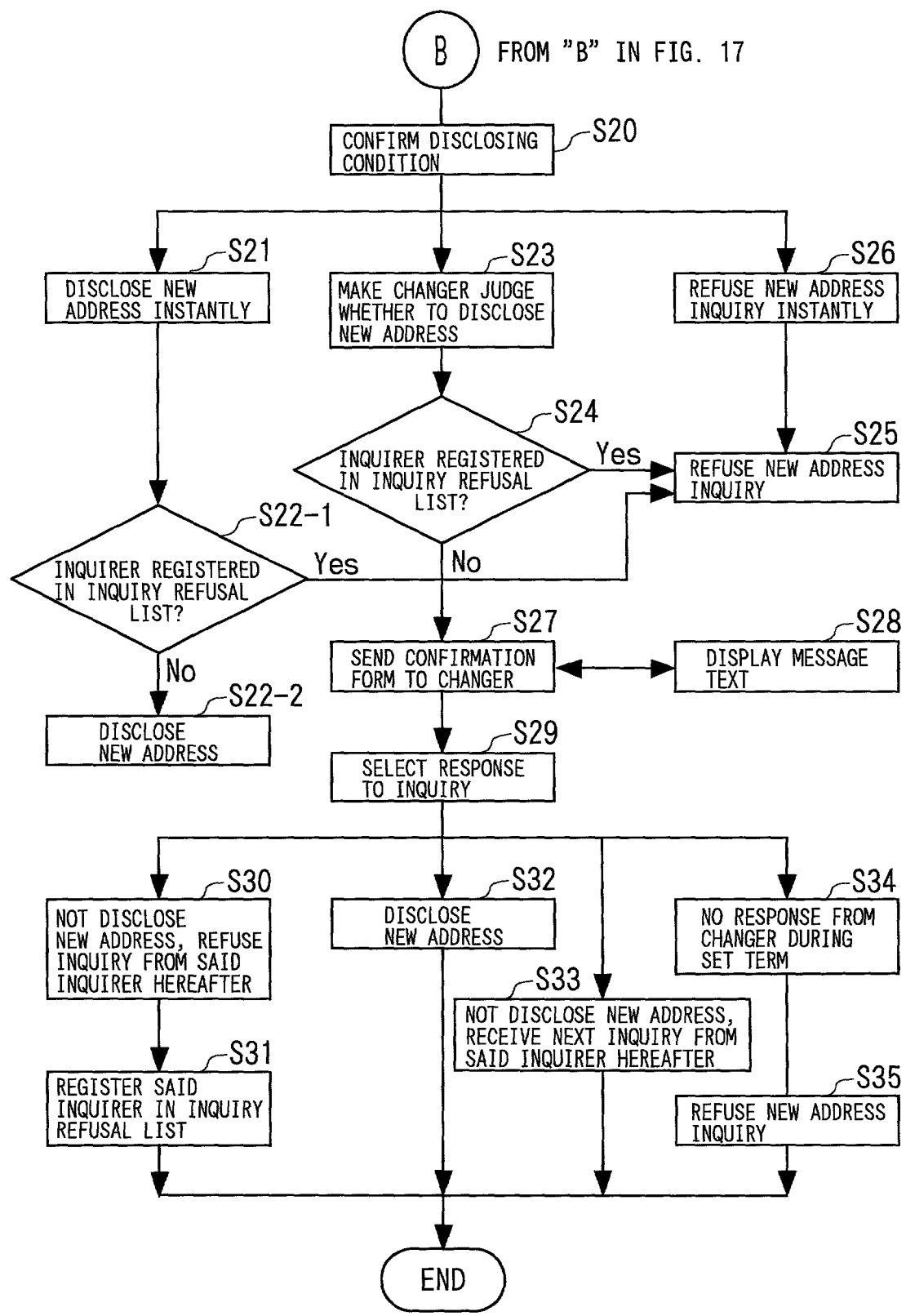
FIG. 22 is a third flowchart showing the process of registration of inquirer information and inquiry about the new address.

Based on the press of the "Start inquiry" buttons 100 and 103 by the inquirer 5, the new address disclosure judge 51 takes the address disclosing condition 17 out of the changer data base 10 and confirms which pattern out of the numerals 28 to 30 shown in FIG. 2 the address disclosing condition 17 of the changer 3 imposed on the inquiry about the new address 24 is (step S20 in FIG. 22).

When the address disclosing condition 17 is "Disclose new address instantly" (the numeral 28 in FIG. 2), the inquiry refusal list 18 is then checked in this embodiment, and only when the inquirers 5 are not registered in the inquiry refusal list 18, the new address 24 is disclosed unconditionally to all the inquirers 5 (steps S21, S22-1, and S22-2). In this case, the address disclosure judge 51 and the discloser 54 in the address inquiry system 1 display a screen shown in FIG. 26 in the inquirer terminal 6 and disclose the new address 24 of the changer 3 to the inquirer 5. In this example, only an e-mail address is disclosed as the new address 24, but other sorts of new addresses 24, that is, a URL address, an address, a telephone number, and the like can be displayed according to the disclosure rule 25.

When the address disclosing condition 17 registered by the changer 3 is "Make changer judge whether to disclose new address without disclosing new address instantly" (the numeral 29 in FIG. 2), the inquiry refusal list 18 is then checked in this embodiment, and only when the inquirer 5 is not registered in the inquiry refusal list 18, the process advances to the next step (steps S23 and S24).

FIG. 27 shows an example of a notice screen in the inquirer terminal 6 by the new address disclosure judge 51 and the discloser 54 when the inquirer 5 is not registered in the inquiry refusal list 18. This example shows a notice of the inquiry result when the plural changers 3 (a changer A and a changer B) are selected on the screen shown in FIG. 21, and the new address 24 regarding the changer A is disclosed by the pattern shown by the numeral 28 in FIG. 2. Meanwhile, regarding the changer B, the inquirer 5 is informed that the changer 3 judges whether to disclose the new address 24 according to the pattern shown by the numeral 29 in FIG. 2.

Incidentally, even when this pattern is selected, if the inquirer 5 is registered in the inquiry refusal list 18, his or her inquiry is refused (step S25). In this case, the screen shown in FIG. 25 is displayed in the inquirer terminal 6.

Further, when the address disclosing condition 17 registered by the changer 3 is "Refuse inquiry about new address instantly" (the numeral 30 in FIG. 2), inquiries from all the inquirers 5 are refused unconditionally in this embodiment (steps S26 and S25). Also in this case, the same screen shown in FIG. 25 is displayed in the inquirer terminal 6.

Next, the process of the confirmation of the changer 3 in step S27 and the following steps will be explained.

Figure 23:
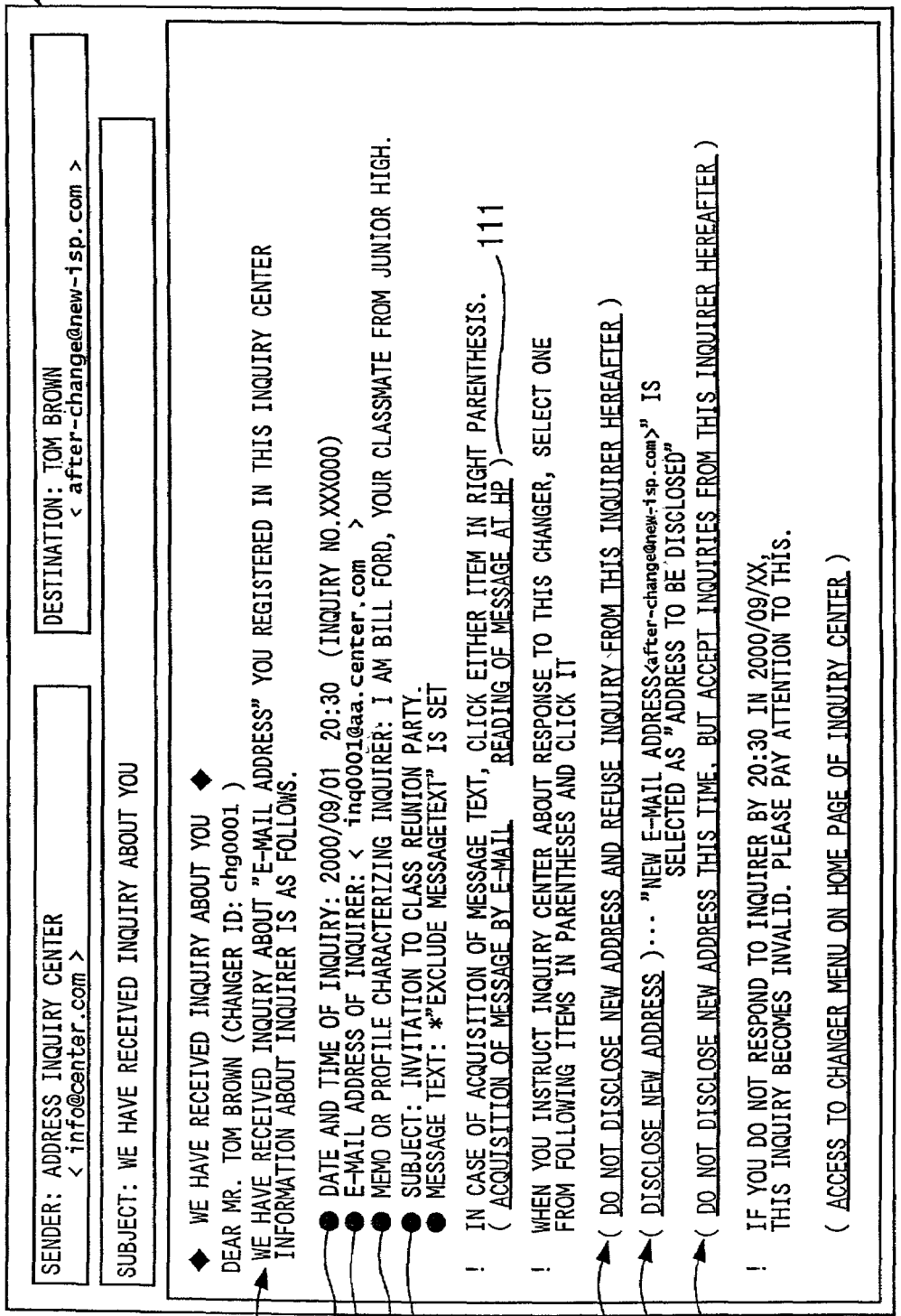
FIG. 23 shows an example of an interface screen for explaining an inquiry operation by an address inquiry system.

In this case, the new address disclosure judge 51 sends an e-mail of a confirmation form 105 with contents shown in FIG. 23 to the changer 3 to confirm whether the new address 24 is disclosed or not (step S27 in FIG. 22). In the confirmation form 105, a notice 106 that an inquiry about the new address 24 is sent, a date and time of the inquiry 107, an address 108 of the inquirer 5, a profile 109 of the inquirer 5, and a subject 110 are displayed. When "without message text" (the pattern shown by 32 in FIG. 2) is set in the confirmation form format 19, the message text in the inquiry message 90 shown in FIG. 18 received from the inquirer 5 is not displayed as described above. However, by selecting a link 111 for obtaining and displaying the message text, an e-mail in which the message text is described can be received (step S28).

Meanwhile, in the confirmation form 105, as shown in FIG. 23, the changer 3 who receives it can select a response to this inquiry among hyperlinks shown by the numeral 112 to 114 in FIG. 23, that is, in this embodiment, can select a response from "Do not disclose new address, and refuse inquiry from this inquirer hereafter" (the hyperlink shown by the numeral 112 in FIG. 23), "Disclose new address" (the hyperlink shown by the numeral 113 in FIG. 23), or "Do not disclose new address this time, but receive inquiries from this inquirer hereafter" (the hyperlink shown by the numeral 114 in FIG. 23).

FIG. 31 is an example of a notice to the inquirer 5 when "Do not disclose new address, and refuse inquiry from this inquirer hereafter" (the hyperlink shown by the numeral 112 in FIG. 23) is selected. In this case, the inquirer 5 is registered to the inquiry refusal list 18, and hereafter inquiries from the said inquirer 5 are automatically refused until the changer 3 changes the setting (steps S30 and S31).

FIG. 32 is an example of a notice to the inquirer 5 when "Disclose new address" (the hyperlink shown by the numeral 113 in FIG. 23) is selected (step S32). Via this screen, the inquirer 5 can know the new address 24 of the changer 3 and get access to the said changer 3 by e-mail or the like.

FIG. 28 shows an example of the contents of an e-mail received when the changer 3 selects "Do not disclose new address this time, but receive inquiries from this inquirer hereafter" (the hyperlink shown by the numeral 114 in FIG. 23) in the confirmation form 105 shown in FIG. 23. In this example, the changer 3 refuses an inquiry about the new address 24 from the inquirer 5 but does not register this inquirer in the inquiry refusal list 18, and thereby a notice that the similar inquiries can be made hereafter is given (step S33). Moreover, when the changer 3 selects nothing within a predetermined period, an e-mail shown in FIG. 29 is transmitted, the inquiry is refused, and the processing is completed (steps S34 and S35).

Incidentally, the display screens in FIGS. 28, 29, 31, and 32 show examples in the case where the changer 3 who discloses the new address is singular. When an inquiry is made about a plurality of changers 3 at the same time, a list of results of responses to the permission of disclosure of new addresses of the plurality of changers 3 may be displayed all at once by the same screens. Further, the display screens in FIGS. 28, 29, 31, and 32 are notice screens when a notice from the address inquiry system 1 is received by e-mail. Meanwhile, the inquirer 5 can confirm this notice through a Web page by being authenticated by the address inquiry system 1 and logging therein.

A notice of the inquiry result to the inquirer 5 is executed by the discloser 54, and the monitoring of the aforesaid predetermined period is executed by the inquiry process monitor 53. If the new address 24 obtained as the result of the inquiry is a home page address, the new location displayer 86 operates to make the browser 80 display a home page of the new location automatically.

According to the configuration explained above, the following effects can be obtained.

(1) In most of conventional services, the inquirer 5 is informed about the new address of the changer 3 unconditionally if the inquirer 5 inquires about the old address 23 and the said old address is registered. Namely, in such services, it is impossible to selectively inform the inquirers 5 about the new address 24 depending on the inquirers 5.

Contrary to this, according to the aforesaid embodiment, the changer 3 can freely set the address disclosing condition 17 of the new address 24 and judge whether to disclose the new address 24 after checking the profile of the inquirer 5, thereby producing an effect that flexible responses to meet the situation of the changer 3 can be made with regard to the disclosure of the new address 24.

(2) In conventional services, the changer 3 side cannot know when or to whom the new address 24 is disclosed.

Contrary to this, according to the aforesaid embodiment, the changer 3 can receive a confirmation form to confirm whether the new address 24 is disclosed to the inquirer 5, and the changer 3 can determine when and to whom the new address 24 is disclosed by controlling his or her response to the confirmation form.

(3) Conventionally, to notify a third party of the change information 15 of a URL of a home page, it is necessary to notify him or her of a URL (the new address 24) of a new home page on the old home page. Therefore, a domain name of the old home page and a contract with an Internet service provider need to be maintained, which causes a problem that the cost thereof needs to be borne during the notification of the change information 15.

Contrary to this, according to the aforesaid embodiment, the address inquiry system 1 can provide an inquiry about the URL (the new address 24) of the new home page, so that a domain server of the old home page or the contract with the Internet service provider does not need to be maintained. Thus, to the changer 3, server administration becomes easier, and the cost of maintaining servers can be reduced.

(4) When the change information 15 about a telephone number or a mail address is given, there is a limit in terms of a period to the present service of a telephone office or a post office.

Contrary to this, according to the aforesaid embodiment, the new address 24 can be disclosed regardless of the service of the telephone office or the post office.

(5) In the case of mail service, the receiver needs to inform a sender of mail delivered to the old address about the new address on another occasion by himself or herself as described above.

Contrary to this, according to the aforesaid embodiment, the system can respond to an inquiry about a new mail address (the new address 24) in place of the receiver of the mail, thereby eliminating such a trouble.

(6) Meanwhile, in transport by the majority of private companies, it is impracticable to make a forwarding request to all of transport companies, and moreover, some private companies do not accept such a request.

Contrary to this, if the address inquiry system 1 is used, a private transporter can be used after the new address 24 of the changer 3 is known, which makes it possible to ensure the delivery of a load and the like by such transporter.

(7) Addresses sometimes cease to be used for some reason. Namely, the use of the addresses themselves is sometimes stopped without the telephone number being changed. In this case, since the conventional service handles only addresses of the same sort, some who know only the telephone number cannot know other addresses of the changer 3.

Contrary to this, according to this embodiment, by setting the disclosure rule 25, inquiries about the new addresses 24 of different sorts can be made, for example, a new telephone number (the new address 24) is detected based on the e-mail address (the old address 23), whereby the aforesaid trouble is eliminated.

It should be mentioned that the present invention is not limited to the aforesaid embodiment, and various changes may be made therein without changing the spirit of the present invention.

For example, it is already described that processing can be executed by the same process as above also in the case of an inquiry about a new home page URL as the new address 24. The home page, however, aims at being opened to the public, and hence the permission of disclosure of a URL at a new location is often given unconditionally. In this case, it is imagined that it is troublesome to follow the same steps as that of the e-mail address, which is sometimes unbecoming for the purpose of the home page.

To cope with this, in the aforesaid special-purpose software, based on the detection of "An access destination is unknown" by the browser 80, the inquiry message maker 84 and the inquiry executor 85 may automatically make out an inquiry message and transmit it to the address inquiry system 1 without obtaining confirmation from the inquirer 5.

If the changer searcher 49 finds the new address 24 (new location URL), the discloser 54 or the new location displayer 86 may give a command to the inquirer terminal 6 to display a Web page concerned in the new address 24.

Figure 30:
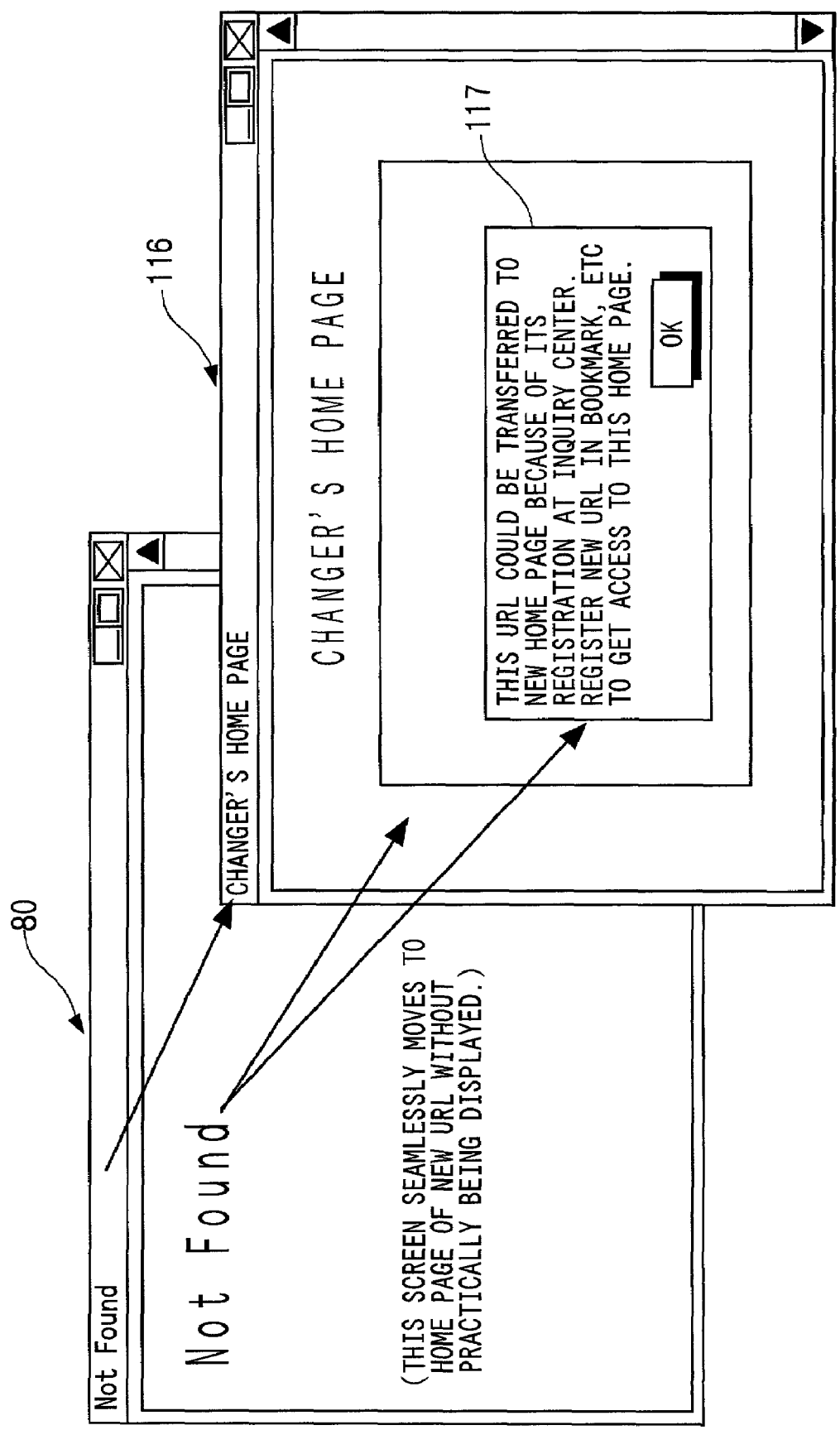
FIG. 30 shows an example of an interface screen for explaining another embodiment of the present invention.

Such a configuration enables the automatic display of a new home page 116 at the new location in the inquirer terminal 6 based on the detection of "An access destination to a desired home page is unknown" by the browser 80 as shown in FIG. 30. In this case, it is preferable to display also a screen 117 for persuading the inquirer 5 to renew the access destination in order to call the attention of the inquirer 5. Further, it is more preferable to display the new home page 116 at the new location without displaying an error display screen of "An access destination is unknown" by the browser 80.

Furthermore, in the aforesaid embodiment, the confirmation form (the screen shown by the numeral 105 in FIG. 23) from the address inquiry system 1 to the changer 3 is sent only when the response pattern (2) is selected (step S23) as shown in step S27 in FIG. 22, but the present invention is not limited to this.

For example, even when the response pattern (1) or (3) is selected (step S21 or S26), it is possible to send the changer 3 this form as an general notice in which information such that about which address, from what sort of the inquirer 5, and on what sort of matter an address inquiry is received is described when the inquiry about the new address 24 is received from the inquirer 5. Moreover, it is possible to include a message text to the changer in this notice.

In this case, however, it is preferable that only in the notice when the response pattern (2) is selected, the hyperlinks (the hyperlinks shown by the numeral 112 to 114 in FIG. 23) for confirming whether to disclosed the new address to the inquirer exist and that a response to the permission of disclosure of the new address is given with reference to the information about the inquirer 5 displayed in this notice.

Moreover, in the aforesaid embodiment, a registrant is explained with the changer 3 who has changed his or her own address from the old address 23 to the new address 24 as an example, but the registrant in the present invention is not limited to the changer 3 like this. For example, the registrant may be one who registers his or her own e-mail address or the like only to disclose it to others (the inquirer 5). Furthermore, based on the old address 23 of the changer 3, the new address 24 thereof is searched and disclosed in the aforesaid embodiment, but the present invention is not limited to this. The new address 24 may be searched by using information except the old address 23, for example, some attribute information of the changer 3.

As explained above, when an inquiry about a new address of a registrant is sent from an inquirer, various responses, with a high degree of freedom, can be made depending on the registrant's intention according to the present invention.

The embodiment explained above intends to clarify technical meaning of the present invention. Therefore, the present invention is not intended to be limited to the above concrete embodiment and to be interpreted in a narrow sense, and various changes can be made therein without departing from the spirit of the present invention and within the meaning of the claims.

What is claimed is:

1. An address inquiry system for informing an inquirer of a new address of a changer based on an old address of the changer via an Internet, the old address having been changed to the new address, the system comprising:
   a data base relationally storing at least the old address, the new address, and an address disclosing condition capable of setting a condition whereby the changer judges whether to give permission to disclose the new address such that the changer controls who has access to the new address;
   a means for searching the new address corresponding to the old address and the address disclosing condition from the data base when the inquirer sends an inquiry including the old address;
   a means for making the changer confirm whether the new address is disclosed when the address disclosing condition in searching includes the set condition;
   a means for informing the inquirer of the new address via the system when the changer permits the disclosure of the new address; and
   a means for refusing an inquiry from the inquirer via the system when the changer refuses to permit the disclosure of the new address,
   wherein the data base includes a list of specific inquirers who are refused inquiries about the new address,
   wherein the means for refusing adds the inquirer to the list and informs the inquirer that the inquiry is refused when the changer refuses to permit the disclosure of the new address, and refuses a subsequent inquiry from the inquirer included in the list until the changer changes a refusal status for the inquirer, and
   wherein, if the inquirer inquires of the new address twice and was refused, then future requests from the inquirers to the changer are not forwarded to the changer.

2. The address inquiry system as set forth in claim 1, wherein the data base relationally stores a plurality of old addresses and one new address.

3. The address inquiry system as set forth in claim 2, wherein the address disclosing condition is allowed to be set on each of the plurality of old addresses in the data base.

4. The address inquiry system as set forth in claim 1, wherein the old address and the new address each include at least one sort out of an electronic mail address, an IP address, a Uniform Resource Locator, a telephone number, an address, and a residence.

5. The address inquiry system as set forth in claim 4, further comprising:
   a means for informing the inquirer of the new address of a predetermined sort according to the sort of the old address included in the inquiry sent from the inquirer.

6. The address inquiry system as set forth in claim 1, wherein the inquiry sent from the inquirer includes a message text sent from the inquirer to the changer,
   the system, further comprising:
   a means for sending the message text to make the changer confirm whether the new address is disclosed according to the selection of the changer.

7. The address inquiry system as set forth in claim 1, wherein the attribute information about the inquirer includes identity information of the inquirer.

8. A system for making an inquiry about an address, comprising:
   an address data base, in which a registrant registers his or her own address, relationally storing an address disclosing condition for an inquirer who wishes to know the address of the registrant such that the registrant controls who has access to his or her own address;
   a disclosure judging means for judging whether to disclose the address to the inquirer based on the address disclosing condition when the inquirer makes an inquiry about the address of the registrant;
   an address disclosing means for disclosing the address of the registrant to the inquirer via the system if the disclosure judging means judges that the address is disclosed, wherein the disclosing condition includes information about inquirers to whom the address is disclosed or not disclosed; and
   an address disclosure refusing means for refusing to disclose the address of the registrant to the inquirer via the system if the disclosure judging means judges that the address is refused to be disclosed until the registrant changes a refusal status for the inquirer, wherein the disclosure judging means includes a confirming means for making the registrant confirm whether the address is disclosed to the inquirer when the inquirer who inquires about the address is not registered in the inquirers in the disclosing condition, wherein the confirming means informs the registrant of the attribute information about the inquirer at the time of confirmation, and includes a disclosing condition registering means for receiving a confirmation result from the registrant and registering the inquirer in the disclosing condition as an inquirer to whom the address is disclosed or not disclosed, wherein the address data base stores one, or two or more old addresses of the registrant, wherein the disclosure judging means receives the old address of the registrant in the inquiry about the address of the registrant from the inquirer and acquires the address disclosing condition of the registrant by searching the address data base with this old address, and wherein, if the inquirer inquires of the new address twice and was refused, then future requests from the inquirers to the registrant are not forwarded to the registrant.

9. The system as set forth in claim 8,
wherein the address data base stores one, or two or more old addresses of the registrant, and
wherein the disclosure judging means receives the old address of the registrant in the inquiry about the address of the registrant from the inquirer and acquires the address disclosing condition of the registrant by searching the address data base with this old address.

10. The system as set forth in claim 8,
wherein the information about the inquirers to whom the address is disclosed or not disclosed includes information that the address is disclosed or not disclosed to all of the inquirers or only a part thereof.

11. The system as set forth in claim 8,
wherein the attribute information includes a profile of the inquirer.

12. The system as set forth in claim 8, further comprising:
an inquirer attribute information storing means for previously storing the attribute information about the inquirer; and
an inquirer attribute information registering means for accepting registration of the attribute information from the inquirer when the attribute information of the inquirer is not stored by the inquirer attribute information storing means.

13. The system as set forth in claim 8,
wherein the confirming means allows a part or all of a message to the registrant received from the inquirer to be sent to the registrant.

14. The system as set forth in claim 8,
wherein the disclosure judging means refuses to disclose the address to the inquirer when a response to a confirmation requested by the confirming means is not obtained from the registrant before a predetermined deadline.

15. The system as set forth in claim 8, further comprising:
a means for informing the registrant that the inquirer made the inquiry about the address.

16. The system as set forth in claim 8,
wherein the address is an electronic mail address.

17. The system as set forth in claim 8,
wherein the address is a home page address.

18. The system as set forth in claim 8,
wherein the address is a telephone number or an address/residence.

19. The address inquiry system as set forth in claim 8, wherein the attribute information about the inquirer includes identity information of the inquirer.

20. A computer software product for instructing a computer system to inquire of a system according to claim 8 for making an inquiry about an address, about an address, comprising:
a storage medium; and
an inquiry instructing means, stored in the storage medium and started based on the return of an electronic mail because its destination is unknown, for instructing the computer system to inquire of the system for making the inquiry about the address about an electronic mail address of an addressee of the electronic mail.

21. A computer software product for instructing a computer system to inquire of a system according to claim 8 for making an inquiry about an address, comprising:
a storage medium; and
an inquiry instructing means, stored in the storage medium and started based on the impossibility of display of a home page because its destination is unknown, for instructing the computer system to inquire of the system for making the inquiry, about the address about an address of the home page.

22. The computer software product as set forth in claim 21, further comprising:
a home page displaying means for instructing the computer system to display the home page concerned in the address based on the disclosure of the address by the system for inquiring about the address.

23. A method for inquiring about an address of a registrant with a system connecting to an Internet, comprising:
an inquiry receiving step of receiving an inquiry about the address of the registrant from an inquirer;
a registration judging step of judging whether the registrant is registered in an address data base;
a disclosure judging step of judging whether the address is disclosed to the inquirer based on a predetermined disclosing condition when the registrant is registered in the address data base;
an address disclosing step of disclosing the address of the registrant to the inquirer via the system if it is judged that the address is disclosed in the disclosure judging step such that the registrant controls who has access to the address of the registrant; and
and address disclosure refusing step of refusing to disclose the address of the registrant to the inquirer via the system if it is judged that the address is refused to be disclosed in the disclosure judging step until the registrant changes a refusal status for the inquirer,
wherein the disclosing condition includes information about inquirers to whom the address is disclosed or not disclosed,
wherein the disclosure judging step includes a confirming step of making the registrant confirm whether the address is disclosed to the inquirer when the inquirer who inquires about the address is not registered in the inquirers in the disclosing condition,
wherein the confirming step includes a reporting step or reporting attribute information about the inquirer to the registrant, and a disclosing condition registering step of receiving a confirmation result from the registrant and registering the inquirer in the disclosing condition as an inquirer to whom the address is disclosed or not disclosed, and wherein it is judged whether the registrant is registered by searching the data base with an old address of the registrant in the registration judging step, and wherein, if the inquirer inquires of the new address twice and was refused, then future requests from the inquirers to the registrant are not forwarded to the registrant.

24. The method as set forth in claim 23, wherein the registration judging step includes a step of making the inquirer select a registrant whose address the inquirer inquires about when the old address of the registrant is registered for a plurality of registrants in the data base.

25. The method as set forth in claim 23, wherein the attribute information includes a profile of the inquirer.

26. The method as set forth in claim 23, further comprising:

an inquirer attribute information storing step of previously receiving and storing the attribute information about the inquirer.

27. The method as set forth in claim 23, wherein a part or all of a message to the registrant received from the inquirer is allowed to be sent to the registrant in the confirming step.

28. The method as set forth in claim 23, wherein the disclosure of the address to the inquirer is refused in the disclosure judging step when a response to a confirmation requested in the confirming step is not obtained from the registrant before a predetermined deadline.

29. The method as set forth in claim 23, further comprising:

a step of informing the registrant that the inquirer made the inquiry about the address.

30. The method as set forth in claim 23, wherein the address is an electronic mail address.

31. The method as set forth in claim 30, further comprising:

a step of making an inquiry about the address based on the return of an electronic mail sent from the inquirer to the registrant because its destination is unknown.

32. The method as set forth in claim 23, wherein the address is a home page address.

33. The method as set forth in claim 32, further comprising:

a step of making an inquiry about the home page address of the registrant based on the refusal of a request for the display of a home page transmitted from the inquirer to the registrant because its destination is unknown.

34. The method as set forth in claim 23, wherein the address is a telephone number or an address/residence.

35. The address inquiry system as set forth in claim 23, wherein the attribute information about the inquirer includes identity information of the inquirer.

36. An address inquiry system for informing an inquirer of a new address of a changer based on an old address of the changer via an Internet, the old address having been changed to the new address, the system comprising:

a data base relationally storing at least the old address, the new address, and an address disclosing condition capable of setting a condition whereby the changer judges whether to give permission to disclose the new address such that the changer controls who has access to the new address;

a search device which searches the new address corresponding to the old address and the address disclosing condition from the data base when the inquirer sends an inquiry including the old address;

a change confirmation device which makes the changer confirm whether the new address is disclosed when the address disclosing condition in searching includes the set condition;

an informing device which informs the inquirer of the new address via the system when the changer permits the disclosure of the new address; and a refusal device which refuses an inquiry from the inquirer via the system when the changer refuses to permit the disclosure of the new address, wherein the data base includes a list of specific inquirers who are refused inquiries about the new address, wherein the refusal device adds the inquirer to the list and informs the inquirer that the inquiry is refused when the changer refuses to permit the disclosure of the new address, and refuses a subsequent inquiry from the inquirer included in the list until the changer changes a refusal status for the inquirer, and wherein, if the inquirer inquires of the new address twice and was refused, then future requests from the inquirers to the changer are not forwarded to the changer.

* * * * *